(12) United States Patent
Yamaji et al.

(10) Patent No.: US 9,187,058 B2
(45) Date of Patent: Nov. 17, 2015

(54) AIRBAG DEVICE

(71) Applicants: Naoki Yamaji, Settsu (JP); Satoshi Yamashita, Settsu (JP)

(72) Inventors: Naoki Yamaji, Settsu (JP); Satoshi Yamashita, Settsu (JP)

(73) Assignee: ASHIMORI INDUSTRY CO., LTD., Osaka-shi (JP)

( * ) Notice: Subject to any disclaimer, the term of this patent is extended or adjusted under 35 U.S.C. 154(b) by 0 days.

(21) Appl. No.: 14/379,034

(22) PCT Filed: Feb. 6, 2013

(86) PCT No.: PCT/JP2013/052720
§ 371 (c)(1),
(2) Date: Aug. 15, 2014

(87) PCT Pub. No.: WO2013/121950
PCT Pub. Date: Aug. 22, 2013

(65) Prior Publication Data
US 2015/0084318 A1    Mar. 26, 2015

(30) Foreign Application Priority Data

Feb. 16, 2012   (JP) .................................. 2012-031668

(51) Int. Cl.
*B60R 21/26*    (2011.01)
*B60R 21/205*   (2011.01)
(Continued)

(52) U.S. Cl.
CPC .............. *B60R 21/26* (2013.01); *B60R 21/205* (2013.01); *B60R 21/239* (2013.01); *B60R 21/276* (2013.01); *B60R 2021/23382* (2013.01)

(58) Field of Classification Search
CPC .............. B60R 21/2338; B60R 21/239; B60R 2021/23384; B60R 2021/2395
See application file for complete search history.

(56) References Cited

U.S. PATENT DOCUMENTS

| 7,261,319 B2 * | 8/2007 | DePottey et al. ............. 280/739 |
| 7,347,450 B2 * | 3/2008 | Williams et al. ............. 280/739 |

(Continued)

FOREIGN PATENT DOCUMENTS

| JP | 2007-099122 | 4/2007 |
| JP | 2008-201214 | 9/2008 |

(Continued)

OTHER PUBLICATIONS

International Search Report issued Apr. 9, 2013, in PCT/JP13/052720, filed Feb. 6, 2013.

(Continued)

*Primary Examiner* — Drew Brown
(74) *Attorney, Agent, or Firm* — Oblon, McClelland, Maier & Neustadt, L.L.P.

(57) ABSTRACT

An airbag device includes: an airbag; an inflator; a gas discharge state switching member; and a tether belt which is one example of a connecting member. The gas discharge state switching member is switched over from a gas discharge state to a gas non-discharge state by being pulled into the inside of the airbag. The tether belt connects the gas discharge state switching member and a portion of an inner peripheral portion of the airbag to each other. An arranged position of the gas discharge state switching member, a position where the tether belt is connected to the inner peripheral portion of the airbag, and a passing line of the tether belt are disposed at portions which avoid a portion of the airbag which comes into contact with an occupant in a regular posture state when the airbag receives the occupant.

7 Claims, 19 Drawing Sheets

(51) Int. Cl.
  *B60R 21/239* (2006.01)
  *B60R 21/276* (2006.01)
  *B60R 21/2338* (2011.01)

(56) References Cited

U.S. PATENT DOCUMENTS

| | | | |
|---|---|---|---|
| 7,607,690 B2 | 10/2009 | Abe et al. | |
| 7,857,347 B2 * | 12/2010 | Abe et al. | 280/743.2 |
| 8,020,891 B2 | 9/2011 | Fukawatase et al. | |
| 8,070,183 B2 * | 12/2011 | Kumagai et al. | 280/743.2 |
| 8,590,927 B2 * | 11/2013 | Mendez et al. | 280/739 |
| 8,678,431 B2 * | 3/2014 | Fischer et al. | 280/743.2 |
| 8,684,404 B2 * | 4/2014 | Fischer et al. | 280/739 |
| 8,684,407 B2 * | 4/2014 | Fischer et al. | 280/743.2 |
| 8,696,022 B2 * | 4/2014 | Fischer et al. | 280/739 |
| 8,870,223 B2 * | 10/2014 | Choi et al. | 280/743.2 |
| 2005/0040634 A1 * | 2/2005 | Braun et al. | 280/742 |
| 2006/0071461 A1 * | 4/2006 | Williams et al. | 280/739 |
| 2006/0071462 A1 * | 4/2006 | Smith et al. | 280/739 |
| 2006/0151979 A1 * | 7/2006 | DePottey et al. | 280/739 |
| 2009/0212538 A1 | 8/2009 | Abe et al. | |
| 2009/0224519 A1 | 9/2009 | Fukawatase et al. | |
| 2010/0001498 A1 | 1/2010 | Abe et al. | |

FOREIGN PATENT DOCUMENTS

| | | |
|---|---|---|
| JP | 2008-207579 | 9/2008 |
| JP | 2009-143483 | 7/2009 |
| JP | 2009-196551 | 9/2009 |
| JP | 2009-196596 | 9/2009 |
| JP | 4666059 B2 | 4/2011 |
| JP | 5045017 B2 | 10/2012 |

OTHER PUBLICATIONS

International Preliminary Report on Patentability issued Aug. 28, 2014 in corresponding PCT/JP2013/052720 filed on Feb. 6, 2013 (with English translation).

English translation of Preliminary Report on Patentability and Written Opinion issued Aug. 28, 2014 in PCT/JP2013/052720 filed on Feb. 6, 2013.

* cited by examiner

F I G. 1
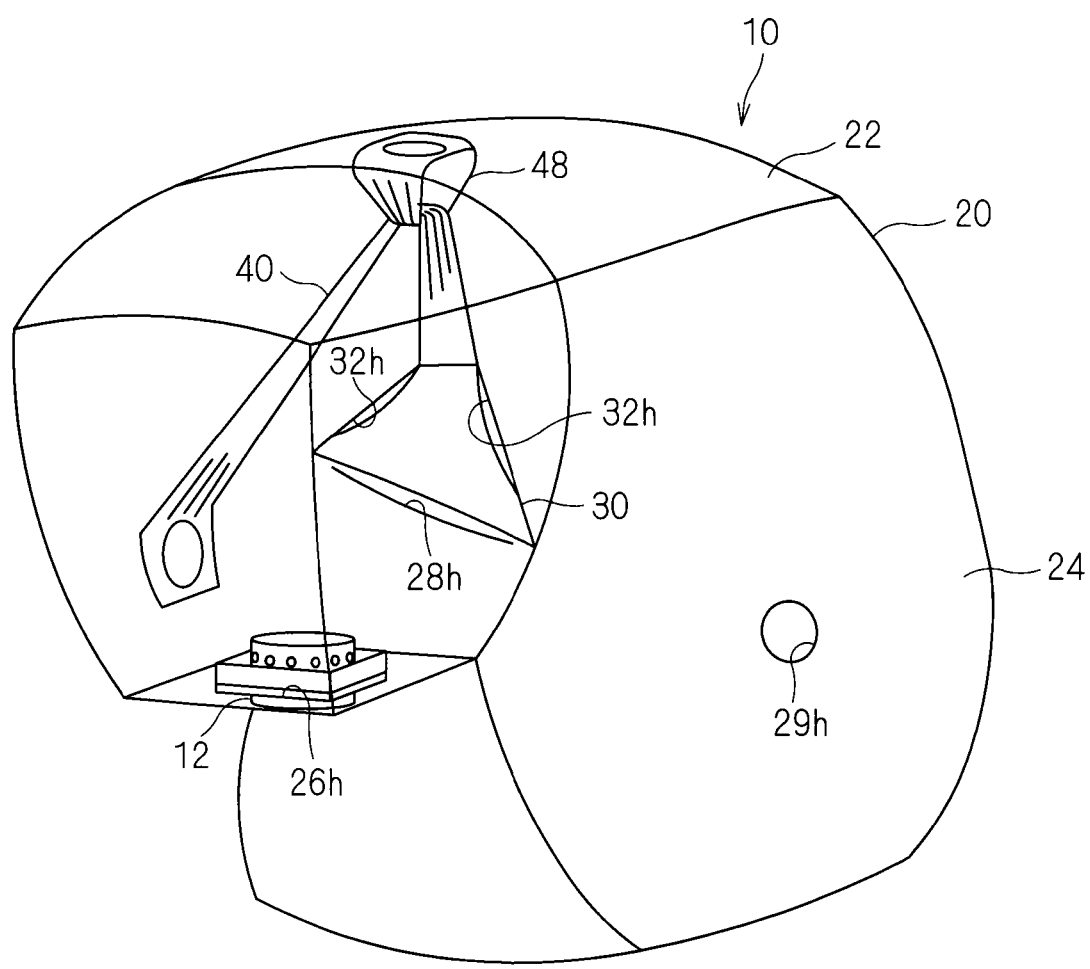

F I G . 1 3
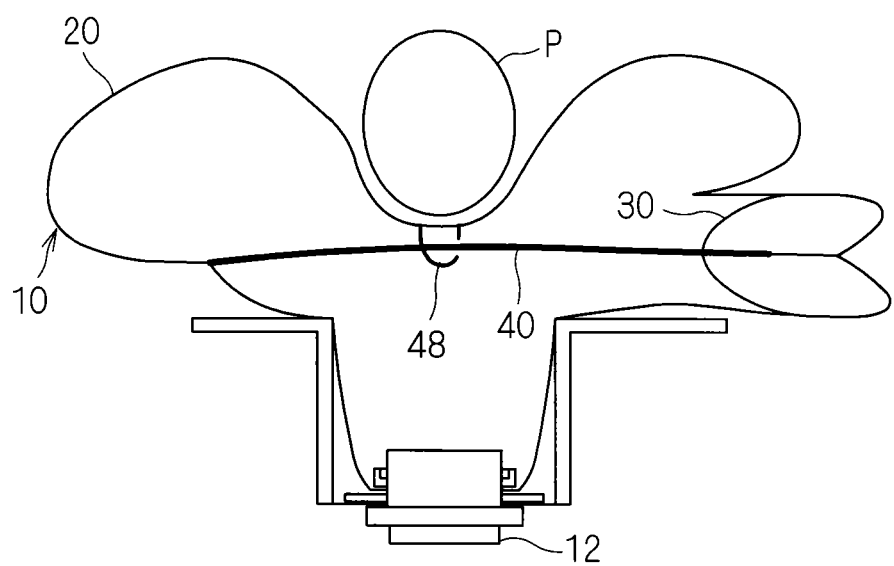

AIRBAG DEVICE

TECHNICAL FIELD

The present invention relates to an airbag device for protecting an occupant in a vehicle.

BACKGROUND ART

Patent Document 1 discloses an airbag which includes regulating means for regulating the outflow of gas through a vent hole. The regulating means includes a squeezing member which can squeeze the vent hole, and a connecting member which is provided for connecting the squeezing member and a surface of the airbag which faces an occupant. When the airbag is inflated, the squeezing member is pulled by way of the connecting member so that the vent hole is closed. However, when the occupant comes into contact with the inflated airbag so that the surface of the airbag which faces the occupant retracts, the squeezing member is loosened so that the vent hole is opened.

As another prior art relating to the present invention, there is Patent Document 2.

PRIOR ART DOCUMENTS

Patent Documents

Patent Document 1: Japanese Patent Application Laid-Open No. 2007-99122
Patent Document 2: Japanese Patent Application Laid-Open No. 2008-207579

SUMMARY OF INVENTION

Problems to be Solved by the Invention

There may be a case where an occupant is in an irregular posture (Out Of Position, also abbreviated as OOP) such as a posture where an occupant bends more frontward compared to a usual riding posture. In such a case, to prevent an airbag from hitting the occupant with a large amount of force, it is preferable to suppress the rapid inflation of the airbag.

Also with the use of the technique disclosed in Patent Document 1, when an occupant is in an irregular posture, it is expected to some extent that, a surface of the airbag which faces the occupant and the occupant come into contact with each other before the airbag is inflated so that a state where the squeezing member is loosened and a state where the vent hole is opened are maintained. In such a case, gas is discharged through the vent hole so that the rapid inflation of the airbag is suppressed to some extent.

However, a proper gas discharge speed necessary for gradually receiving an impact on an occupant after the airbag is inflated differs from a proper gas discharge speed necessary in a case where the occupant is in an irregular posture.

For example, to gradually receive an impact on the occupant after the airbag is inflated, it is desirable that gas be gradually discharged from the airbag. On the other hand, when an occupant is in an irregular posture, it is desirable that gas be rapidly discharged from the airbag so as to prevent the airbag from hitting the occupant with a large force.

In the technique disclosed in Patent Document 1, by estimating the former case, a gas discharge speed is set such that the gas is gradually discharged. Accordingly, even when the occupant is in an irregular posture, the gas discharge speed is at a level that the gas is gradually discharged and hence, there is a possibility that the airbag will be rapidly inflated.

In view of the above, it is an object of the present invention to provide an airbag device which can discharge gas as rapidly as possible when an occupant is in an irregular posture and can suppress rapid discharge of gas when an airbag receives an occupant in a regular posture after the airbag has been inflated.

Means for Solving the Problems

To achieve the above object, a first aspect provides an airbag device including: an airbag body which has a gas supply port; an inflator which supplies gas to the inside of the airbag body through the gas supply port; a gas discharge state switching member which is attached to the airbag body, and is configured to be changed over from a gas discharge state where the gas in the airbag body is dischargeable to a gas non-discharge state where discharge of the gas in the airbag body is suppressed when the gas discharge state switching member is pulled into the inside of the airbag body; and a connecting member which connects the gas discharge state switching member and a portion of an inner peripheral portion of the airbag body to each other, wherein a position where the gas discharge state switching member is arranged, a position where the connecting member is connected to the inner peripheral portion of the airbag body, and a passing line of the connecting member are disposed at portions which avoid a portion of the airbag body which comes into contact with an occupant in a regular posture state when the airbag body in an inflated configuration receives the occupant.

A second aspect provides the airbag device according to the first aspect, wherein the position where the gas discharge state switching member is arranged, the position where the connecting member is connected to the inner peripheral portion of the airbag body, and the passing line of the connecting member are disposed at portions which avoid a portion of the airbag body which is deformed when the airbag body in the inflated configuration receives an occupant in a regular posture state.

A third aspect provides the airbag device according to the first or second aspect, wherein the position where the gas discharge state switching member is arranged, the position where the connecting member is connected to the inner peripheral portion of the airbag body, and the passing line of the connecting member are arranged on a front half portion of the airbag body in an inflated configuration which is inflated from a vehicle assembled state.

A fourth aspect provides the airbag device according to any one of the first to third aspects, wherein an annular relay portion which movably supports the connecting member along a longitudinal direction is attached to the inner peripheral portion of the airbag body in an inflated configuration, and the connecting member is bent by way of the annular relay portion with the airbag body in an inflated configuration.

A fifth aspect provides the airbag device according to the fourth aspect, wherein the gas discharge state switching member is attached to one side portion of the airbag body in an inflated configuration, the annular relay portion is attached to an upper portion or a front portion of the airbag body in an inflated configuration, and one end portion of the connecting member is connected to the gas discharge state switching member and the other end portion of the connecting member is connected to an inner peripheral portion of the other side portion of the airbag body in an inflated configuration by way of the annular relay portion.

A sixth aspect provides the airbag device according to any one of the first to fifth aspects, wherein a vent hole through which the gas is discharged at a gas discharge speed slower than a gas discharge speed of the gas discharge state switching member in the gas discharge state is formed at the airbag body.

A seventh aspect provides the airbag device according to any one of the first to sixth aspects, the airbag device further including a flap which extends such that a proximal end portion of the flap is connected to an outer peripheral portion of the airbag body, and a distal end portion of the flap is directed to a side opposite to the gas supply port and covers the airbag body.

Effects of the Invention

According to the first aspect, when the inflated airbag receives an occupant in a regular posture state, the occupant comes into contact with the contact portion and hence, a state where the connecting member is pulled is maintained so that the gas discharge state switching member maintains a gas non-discharge state. Accordingly, rapid discharge of gas can be suppressed. On the other hand, when the occupant is in an irregular posture state, the occupant comes into contact with the portion of the airbag body which avoids the contact portions of the airbag body when the occupant is in the regular posture. Accordingly, a state where the connecting member is loosened is maintained, and the gas discharge state switching member maintains the gas discharge state or is changed over to a gas discharge state. Accordingly, the gas can be discharged from the gas discharge state switching member as rapidly as possible.

According to the second aspect, when the inflated airbag receives the occupant in a regular posture state, a state where the connecting member is pulled is more surely maintained. Accordingly, rapid discharge of gas can be more surely suppressed. On the other hand, when the occupant is in an irregular posture state, the occupant is more surely brought into contact with the portion of the airbag body where the connecting member is attached. Accordingly, the state where the connecting member is loosened is more surely maintained and hence, the gas can be discharged from the gas discharge state switching member as rapidly as possible.

According to the third aspect, when the inflated airbag receives the occupant in a regular posture state, a state where the connecting member is pulled is more surely maintained. Accordingly, rapid discharge of gas can be more surely suppressed. On the other hand, when the occupant is in an irregular posture state, the occupant is more surely brought into contact with the portion of the airbag body where the connecting member is attached. Accordingly, the state where the connecting member is loosened is more surely maintained and hence, the gas can be discharged from the gas discharge state switching member as rapidly as possible.

According to the fourth aspect, the connecting member is arranged such that the connecting member is bent by way of the annular relay portion. Accordingly, by more surely pulling the connecting member with the airbag in an inflated configuration, the gas discharge state switching member can be pulled into the inside of the airbag body more completely and hence, a gas state can be more surely changed over to a gas non-discharge state.

According to the fifth aspect, the connecting member is arranged extending from one side portion to the other side portion of the airbag body in an inflated configuration by way of the annular relay portion disposed above or in front of the connecting member. Accordingly, by more surely pulling the connecting member with the airbag in an inflated configuration, the gas discharge state switching member can be pulled into the inside of the airbag body more completely and hence, a gas state can be more surely changed over to a gas non-discharge state.

According to the sixth aspect, when the airbag body is normally inflated, the gas can be discharged through the vent hole.

According to the seventh aspect, when the flap comes into contact with the occupant during the inflation of the airbag body with the occupant in an irregular posture, the inflation of the airbag body is suppressed by the contact portion. By partially suppressing the inflation of the airbag body, the pulling of the connecting member can be suppressed so that it is possible to suppress the gas discharge state switching member from being changed over to a gas non-discharge state or it is possible to suppress the gas discharge state switching member from being maintained. Accordingly, it is possible to suppress the rapid inflation of the airbag body as much as possible regardless of the position and the posture of the occupant in an irregular posture.

BRIEF DESCRIPTION OF DRAWINGS

FIG. 1 is a schematic perspective view showing an inflated configuration of an airbag device according to an embodiment.

FIG. 13 is an explanatory view showing operation of the airbag device when an occupant is in an irregular posture.

DESCRIPTION OF EMBODIMENT

Figure 2:
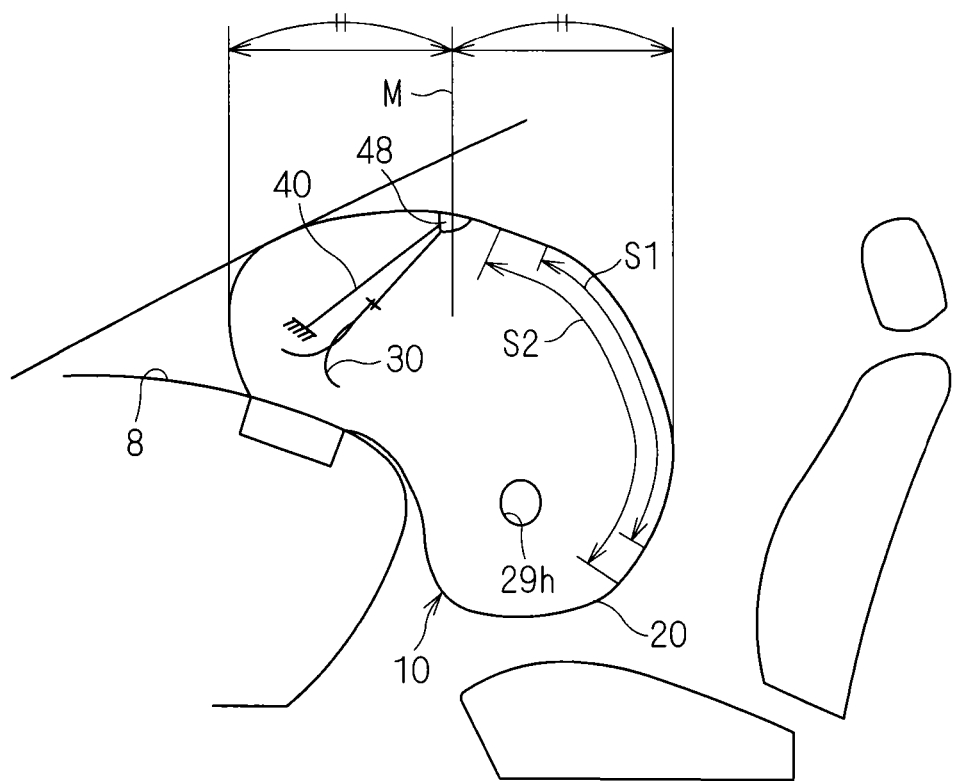
FIG. 2 is schematic side view showing an inflated configuration of the airbag device according to the embodiment.
Figure 3:
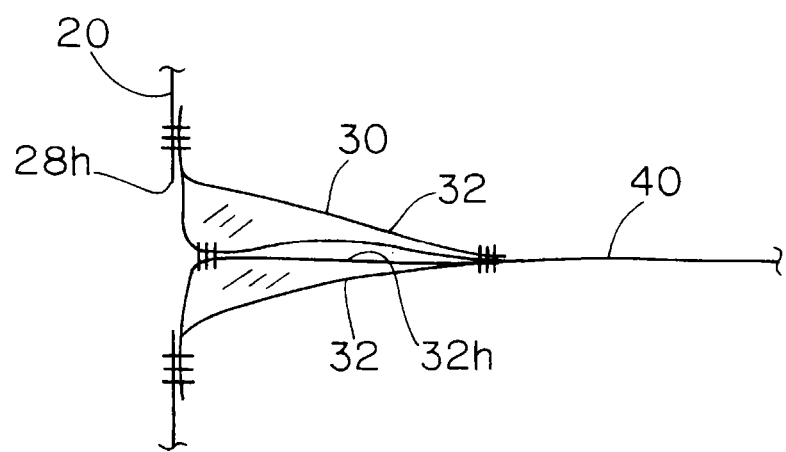
FIG. 3 is a schematic side view showing a gas discharge state switching member in a gas non-discharge state.
Figure 4:
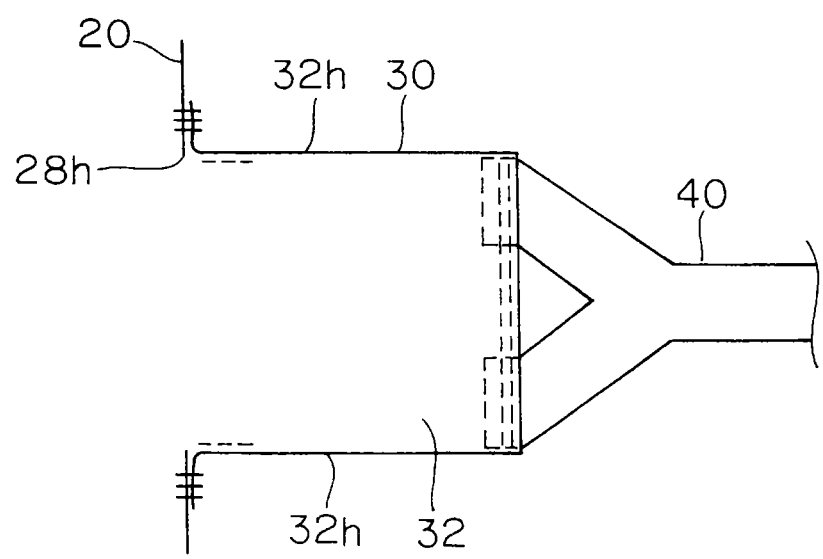
FIG. 4 is a schematic plan view showing the gas discharge state switching member in a gas non-discharge state.

Hereinafter, an airbag device according to an embodiment is described. FIG. 1 is a schematic perspective view showing an airbag device 10 in an inflated configuration and FIG. 2 is a schematic side view showing the airbag device 10 in an inflated configuration in a state where the airbag device 10 is mounted on a dashboard. Here, to show the internal structure of the airbag device 10, a part of FIG. 1 is shown as a transparent view.

This airbag device 10 is a device which is incorporated into a dashboard arranged in front of a passenger seat of a vehicle. The airbag device 10 is deployed toward an area in front of an occupant on a passenger seat and receives the occupant on the passenger seat when the vehicle collides or the like thus absorbing an impact which the occupant receives. It is needless to say that this airbag device is not limited to an airbag device for the passenger seat and is also applicable to an airbag for a driver's seat, the airbag being incorporated into a steering device, or the like.

This airbag device 10 includes: an airbag body 20; an inflator 12; a gas discharge state switching member 30; and a tether belt 40 serving as a connecting member.

The airbag body 20 is formed into an inflatable bag shape and includes a gas supply port 26h and at least one opening portion 28h. The airbag body 20 is, for example, formed into a bag shape and has the following configuration. That is, an approximately cylindrical base fabric portion 22 is formed by joining both end portions of an approximately belt-like cloth to each other by sewing or the like. Further, a pair of side fabric portions 24 having a flared shape which can close side openings of the base fabric portion 22 are also prepared. The edge portions of the side fabric portions 24 are joined to peripheral portions of both side openings of the base fabric portion 22 formed into an approximately cylindrical shape by sewing or the like. Due to such a configuration, the airbag body 20 having a bag shape is formed. Here, the airbag body 20 is formed into a shape where, in a side view, a portion of the airbag body 20 above an inflator 12 inflates toward an occupant side (rear side of the vehicle, right side of FIG. 1) and an occupant side portion of the airbag body 20 inflates downward. It is needless to say that shapes of base fabrics and the combination of the base fabrics for forming the airbag body 20 into a bag shape are not limited to the example. Further, an inflated configuration of the airbag body 20 is not limited to the example.

The gas supply port 26h is formed in a portion of the airbag body 20 which faces the dashboard when the airbag body 20 is in an inflated configuration, more specifically, in a lower portion of a front side of the airbag body 20 in the longitudinal direction of the vehicle (a side away from the occupant, a left side in FIG. 1). The inflator 12 is mounted on the portion where the gas supply port 26h is formed. Here, gas which is generated in the inflator 12 when the vehicle collides or the like is introduced into the inside of the airbag body 20 through the gas supply port 26h.

An opening portion 28h is a hole for discharging gas. Here, the opening portion 28h is formed in a portion of the airbag body 20 which is away from the occupant when the airbag body 20 is in an inflated configuration, more specifically, in a one-side portion of a front side of the airbag body 20 in the longitudinal direction of the vehicle. Here, the opening portion 28h is formed into an elongated hole shape which extends along the longitudinal direction of the airbag body 20 or along a direction slightly oblique from the longitudinal direction of the airbag body 20. However, a shape of the opening portion 28h is not limited to the elongated hole shape, and the opening portion 28h may be formed into a circular hole shape, a polygonal hole shape, or a slit shape.

Here, a second vent hole 29h is formed in the airbag body 20 besides the opening portion 28h. For example, the second vent hole 29h is formed in one side portion, or in both side portions of the airbag body 20 or the like in an inflated configuration. When the second vent hole 29h is formed in one side portion of the airbag body 20 in an inflated configuration, the second vent hole 29h may be formed in the side portion of the side portion of the airbag body 20 which faces the outer side of the vehicle (that is, the door side) or may be formed in the side portion of the airbag body 20 which faces the inside of a cabin.

The second vent hole 29h is provided for gradually discharging air in the airbag body 20 when the airbag body 20 in an inflated configuration receives the occupant in a regular posture. Accordingly, it is preferable that the second vent hole 29h be formed in a portion of the airbag body 20 which is exposed to the outside when the airbag body 20 is in an inflated configuration, for example, in a rear portion (occupant-side portion) of the airbag body 20 in the longitudinal direction of the vehicle when the airbag body 20 is in an inflated configuration. Further, it is preferable that a gas discharge speed of gas discharged from the second vent hole 29h be set to a level that air in airbag body 20 is gradually discharged so that the airbag body 20 gradually receives an impact on the occupant. Accordingly, a gas discharge speed at the second vent hole 29h is preferably set such that the second vent hole 29h can discharge the gas at a slower gas discharge speed than a gas discharge speed of the gas discharge state switching member 30 described later in a gas discharge state (for example, an amount of gas which is discharged per unit time under a fixed internal gas pressure condition). Here, a gas discharge speed of gas discharged from the second vent hole 29h is set by adjusting a size of the second vent hole 29h or the like.

By combining discharge of gas through the second vent hole 29h and a mode for discharging gas using the gas discharge state switching member 30, it is possible to set versatile gas discharge patterns.

The gas discharge state switching member 30 is provided to the opening portion 28h. The gas discharge state switching member 30 is configured to be changed over such that gas discharge state switching member 30 assumes a gas discharge state where gas in the airbag body 20 is dischargeable (see FIG. 5 to FIG. 7) in a state before the gas discharge state switching member 30 is pulled into the airbag body 20, and is changed over from the gas discharge state to a gas non-discharge state where discharge of gas in the airbag body 20 is suppressed (see FIG. 1 to FIG. 4) when the gas discharge state switching member 30 is pulled into the inside of the airbag body 20. The gas discharge state switching member 30 changes over its state between both the gas discharge state and the gas non-discharge state corresponding to a pulling force of the tether belt 40 described later.

To describe the gas discharge state switching member 30 in more detail, the gas discharge state switching member 30 includes a pair of belt-like cloths 32. One end portions (proximal end portions) of the pair of belt-like cloths 32 are sewed such that the one end portions of the pair of belt-like cloths 32 surround a peripheral portion of the opening portion 28h in the inside of the airbag body 20. Here, the gas discharge state switching member 30 may be sewed onto the airbag body 20 on an outer surface of the airbag body 20. Further, the other end portions (distal end portions) of the pair of belt-like cloths 32 are joined to each other by sewing each other over substantially the whole region along the width direction of the belt-like cloths 32. Further, with respect to both side portions of the pair of belt-like cloths 32, only proximal end portions are joined to each other by sewing, and portions other than the proximal end portions are in an open state where the portions are not sewed to each other. Here, first vent holes 32h are formed by space portions surrounded by the non-sewed portions of both side portions of the pair of belt-like cloths 32. Here, the proximal ends of both side portions of the pair of belt-like cloths 32 are sewed to each other over a predetermined length and hence, the positional relationship that the opening portion 28h and the first vent holes 32h are continuously formed with each other is not established, and the opening portion 28h and the first vent holes 32h are formed at positions spaced apart from each other.

Further, a width size of the pair of belt-like cloths 32 is set larger than a width size of the opening portion 28h. Accordingly, a width size of the gas discharge state switching member 30 is also set larger than the width size of the opening portion 28h. Here, when the gas discharge state switching member 30 moves to the outside from the inside of the airbag body 20 or when the gas discharge state switching member 30 moves to the inside from the outside of the airbag body 20 to the contrary, the gas discharge state switching member 30 passes through the opening portion 28h while being deformed such that the gas discharge state switching member 30 is shrunken in the width direction whereby a predetermined resistance acts on the gas discharge state switching member 30. Accordingly, it is possible to suppress the occurrence of a case where the gas discharge state switching member 30 inadvertently changes its state when a pulling force is generated by a tether belt 40 described later or when a predetermined internal pressure or more is not applied to the airbag body 20 or the like.

Figure 5:
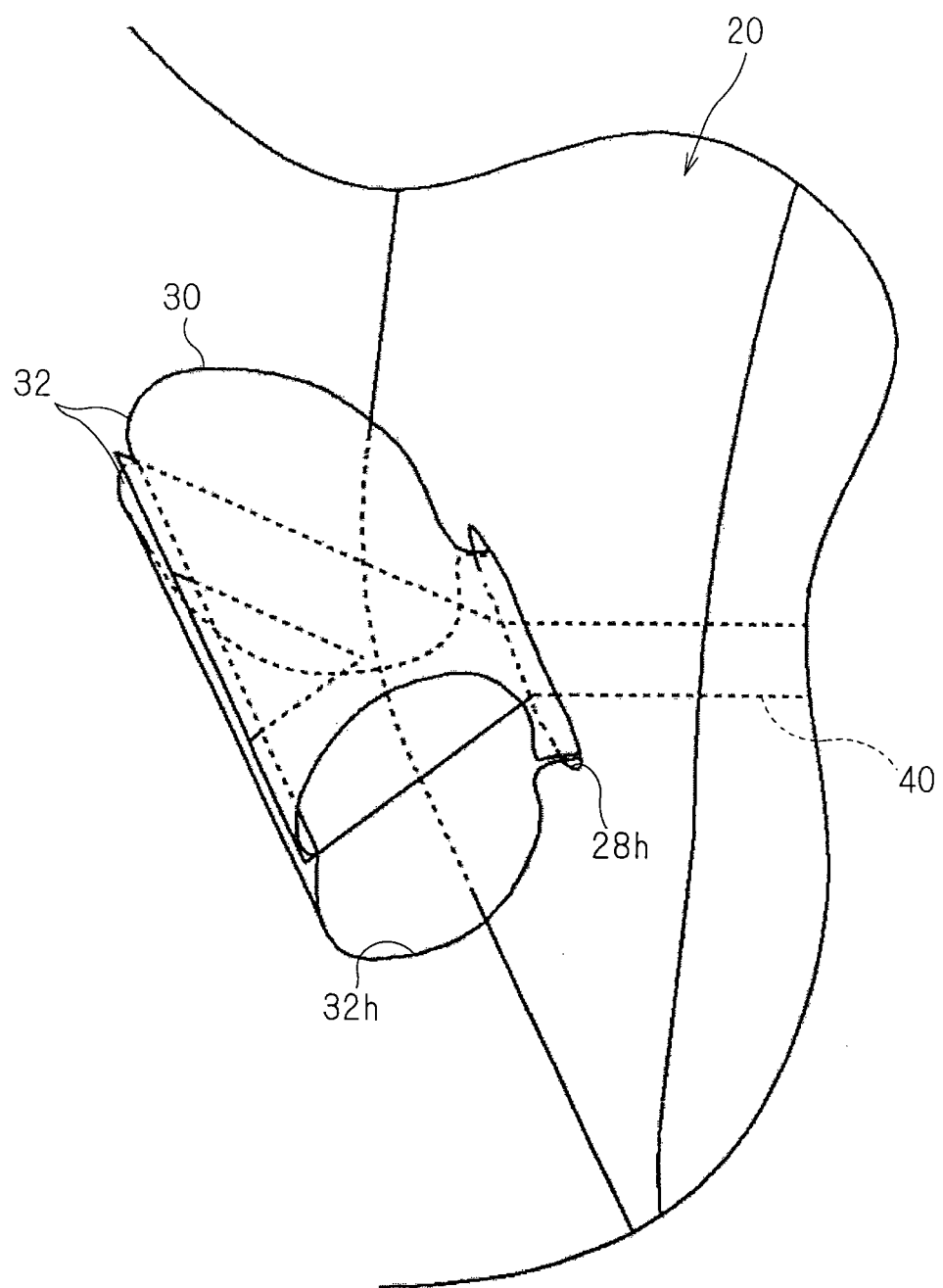
FIG. 5 is a schematic perspective view showing the gas discharge state switching member in a gas discharge state.
Figure 6:
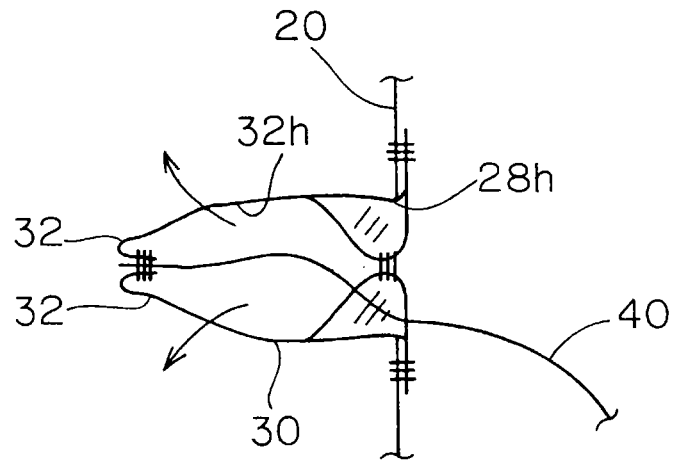
FIG. 6 is a schematic side view showing the gas discharge state switching member in the gas discharge state.
Figure 7:
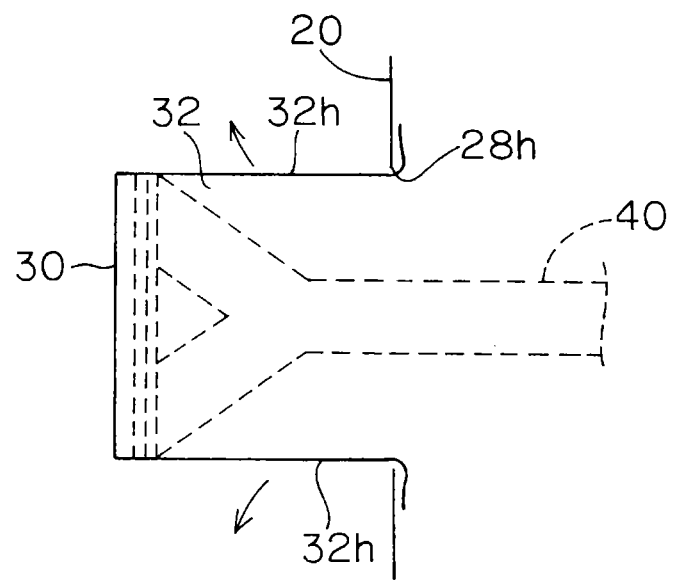
FIG. 7 is a schematic plan view showing the gas discharge state switching member in the gas discharge state.

In a state where the gas discharge state switching member 30 is pulled out to the outside of the airbag body 20 together with the portions which form the first vent holes 32h, the gas discharge state switching member 30 assumes a gas discharge state where gas in the airbag body 20 can be discharged through the first vent holes 32h (see FIG. 5, FIG. 6 and FIG. 7). On the other hand, in a state where the gas discharge state switching member 30 is introduced into the inside of the airbag body 20 together with the portions which form the first vent holes 32h, the gas discharge state switching member 30 assumes a gas non-discharge state where the gas discharge state switching member 30 covers the opening portion 28h so as to close the opening portion 28h thus suppressing discharge of gas in the airbag body 20 (see FIG. 1 to FIG. 4).

The configuration of the gas discharge state switching member 30 is not limited to the example.

Figure 8:
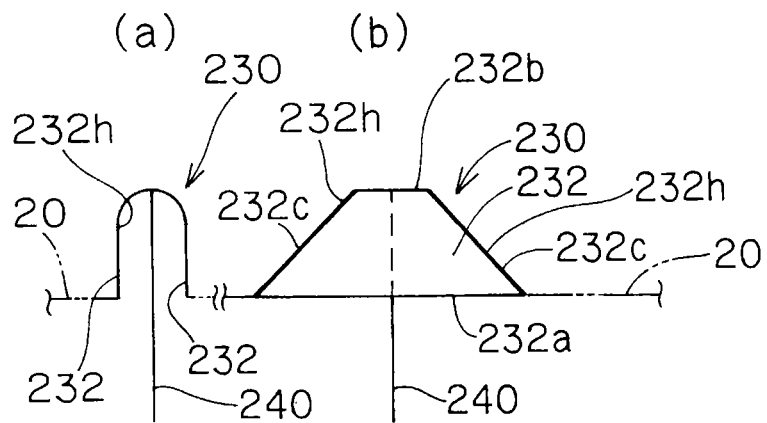
FIG. 8 is a view showing a modification of the gas discharge state switching member.

For example, in a gas discharge state switching member 230 according to a modification shown in FIG. 8, bottom sides 232a which constitute long-side sides of a pair of approximately trapezoidal cloths 232 are attached to an opening portion 28h of an airbag body 20 by sewing and, further, upper sides 232b which constitute short-side sides of the pair of approximately trapezoidal cloths 232 are joined to each other by sewing. Further, one end portion of an elongated tether belt 240 is connected to the joined portion of the upper sides of the pair of approximately trapezoidal cloths 232. Further, a pair of first vent holes 232h is formed by space portions surrounded by oblique sides 232c of the pair of approximately trapezoidal cloths 232 (see portions indicated by bold lines).

Figure 9:
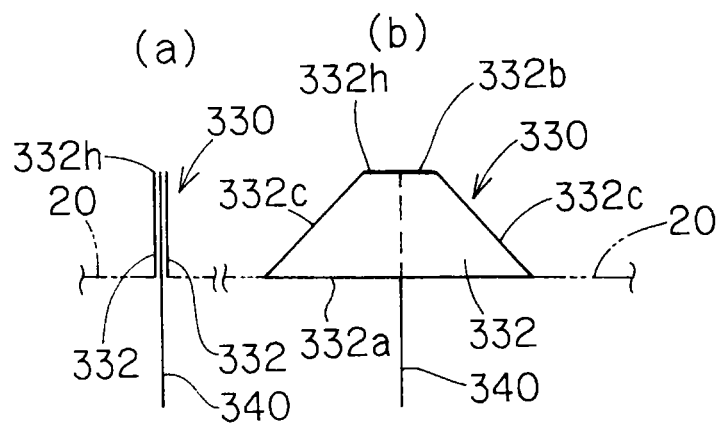
FIG. 9 is a view showing a modification of the gas discharge state switching member.

Further, in a gas discharge state switching member 330 according to a modification shown in FIG. 9, bottom sides 332a which constitute long-side sides of a pair of approximately trapezoidal cloths 332 are attached to an opening portion 28h of an airbag body 20 by sewing and, further, both oblique sides 332c of the pair of approximately trapezoidal cloths 332 are joined to each other by sewing. Further, one end portion of an elongated tether belt 340 is connected to respective upper sides 332b of the pair of approximately trapezoidal cloths 332. Further, a first vent hole 332h is formed by a space portion surrounded by the upper sides 332b of the pair of approximately trapezoidal cloths 332 (see a portion indicated by a bold line).

Figure 10:
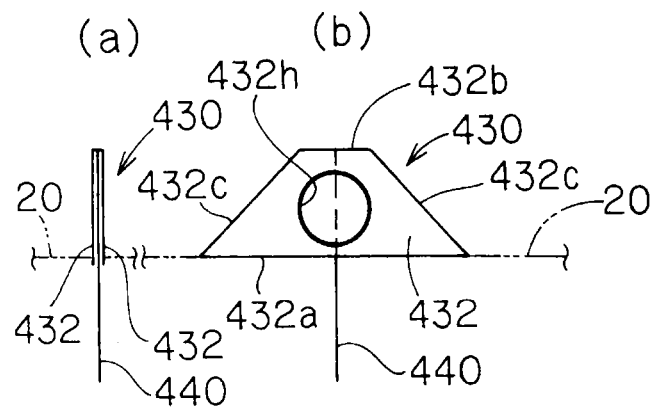
FIG. 10 is a view showing a modification of the gas discharge state switching member.

In a gas discharge state switching member 430 shown in FIG. 10, bottom sides 432a which constitute long-side sides of a pair of approximately trapezoidal cloths 432 are attached to an opening portion 28h of an airbag body 20 by sewing and, further, both oblique sides 432c of the pair of approximately trapezoidal cloths 432 are joined to each other by sewing and both upper sides 432b of the pair of approximately trapezoidal cloths 432 are also joined to each other by sewing. Further, one end portion of an elongated tether belt 440 is connected to respective upper sides of the pair of approximately trapezoidal cloths 432. Further, a hole is formed in one of or both of the pair of approximately trapezoidal cloths 432, and such a hole constitutes a first vent hole 432h.

Also in these respective modifications, in the same manner as the embodiment, the state of the gas discharge state switching member can be changed over between a gas non-discharge state and a gas discharge state by introducing the gas discharge state switching member into the airbag body 20 or by pulling out the gas discharge state switching member to the outside of the airbag body 20.

The tether belt 40 is a member which connects the gas discharge state switching member 30 and a portion of an inner peripheral portion of the airbag body 20 to each other. When the airbag body 20 is inflated into a regular shape (see FIG. 1 and FIG. 2), the tether belt 40 receives an inflation force due to the supply of gas from the inflator 12 so that the tether belt 40 pulls the gas discharge state switching member 30 into the inside of the airbag body 20 thus bringing the gas discharge state switching member 30 into a gas non-discharge state. However, when the airbag body 20 comes into contact with an occupant in an irregular posture in the course of the inflation of the airbag body 20 thus partially interrupting the deployment and inflation of the airbag body 20, the pulling of the gas discharge state switching member 30 by the tether belt 40 is suppressed. Accordingly, the gas discharge state switching member 30 is brought into a state where the change of the gas discharge state switching member 30 into a gas discharge state is allowed.

To be more specific, the tether belt 40 is formed of an elongated member and, in this embodiment, the tether belt 40 is made of a cloth or the like and is formed into a thin elongated belt shape. It is needless to say that a string-like member or the like may be used as the connecting member instead of such an elongated member.

The tether belt 40 is arranged such that the tether belt 40 is maintained in a loosened state when the tether belt 40 comes into contact with an occupant in an irregular posture in the course of the inflation of the airbag body 20, particularly, in an initial stage of the inflation, while the tether belt 40 is maintained in a stretched state when the airbag body 20 in an inflated configuration receives an occupant in a regular posture.

To allow the tether belt 40 to be maintained in a stretched state when the airbag body 20 in an inflated configuration receives the occupant in a regular posture, the following configuration may be adopted.

Firstly, assume a case where an occupant is in a regular posture. The regular posture means a posture where an occupant seat is adjusted to an assumed average in-use position and in-use posture, an occupant having an average build, an average height and an average figure leans his or her body against a back rest and, further, an axis of a head is in a vertical posture. In this embodiment, assume that an occupant in a regular posture is wearing a seat belt. As one example of the regular posture, a posture can be adopted which is stipulated in "S7. Requirements for seat belt assembly" and "S10. Test dummy arranging method" or the like determined by FMVSS (Federal Motor Vehicle. Safety Standard) No. 208 issued on Aug. 29, 2011, and effective from Dec. 27, 2011.

Here, when the airbag body 20 is inflated and assumes a state where the airbag body 20 receives the occupant in a regular posture (that is, inflated configuration), the occupant comes into contact with a rear portion (occupant-side portion) of the airbag body 20, and gradually sinks deeply into the airbag body 20. Accordingly, a contact portion S1 where the occupant in a regular posture comes into contact is present at the rear portion of the airbag body 20 (see FIG. 2 and FIG. 18). Further, a deformed portion S2 which is deformed as the occupant sinks into the airbag body is present in the periphery of the contact portion Si at the rear portion of the airbag body 20 (see FIG. 2 and FIG. 18).

To suppress the loosening of the tether belt 40 when the airbag body 20 in an inflated configuration receives an occupant in a regular posture, firstly, it is preferable that a position where the gas discharge state switching member 30 is arranged, a position where the tether belt 40 is connected to the inner peripheral portion of the airbag body 20, and a passing line of the tether belt 40 be disposed at portions which avoid the contact portion S1 of the airbag body 20 in an inflated configuration. Further, to suppress the loosening of the tether belt 40 more surely in the case, it is preferable that the position where the gas discharge state switching member 30 is arranged, the position where the tether belt 40 is connected to the inner peripheral portion of the airbag body 20, and the passing line of the tether belt 40 be disposed at portions which avoid the deformed portion S2 of the airbag body 20 in an inflated configuration.

Usually, when the airbag body 20 is in an inflated configuration, the occupant comes into contact with the rear portion (occupant-side portion) of the airbag body 20 and sinks into the airbag body 20. Accordingly, it is also safe to say that the position where the gas discharge state switching member 30 is arranged, the position where the tether belt 40 is connected to the inner peripheral portion of the airbag body 20, and the passing line of the tether belt 40 are preferably disposed at a front half portion of the airbag body 20 in an inflated configuration (see FIG. 2). Assuming a state where the airbag body 20 is inflated from the dashboard 8 of the vehicle, the front half portion is a front half portion of the airbag body 20 which is divided in two in the longitudinal direction of the vehicle, and includes a portion of the airbag body 20 on a border line M by which the airbag body 20 is divided in two.

After all, it is sufficient that the position where the gas discharge state switching member 30 is arranged, the position where the tether belt 40 is connected to the inner peripheral portion of the airbag body 20, and the passing line of the tether belt 40 are arranged in a mode where the tether belt 40 is not loosened to the maximum when the airbag body 20 in an inflated configuration receives an occupant in a regular posture. Such a mode may be a mode where the respective positions are disposed at portions closer to a front side portion of the vehicle than to a deepest portion where an occupant in a regular posture sinks most deeply into the airbag body 20 in an inflated configuration, a mode where the respective portions are disposed at portions closer to the front side portion of the vehicle than a rear side portion (occupant-side portion) of the dashboard 8 in the longitudinal direction of the vehicle, a mode where the respective portions are arranged on an inner side of an outer peripheral portion of the airbag body 20 in an inflated configuration which is not visible to an occupant in a regular posture, a mode where the respective portions are arranged on portions of the airbag body 20 in an inflated configuration which come into contact with a front window and portions below portions in the vicinity of the portions which come into contact with the front window, or the like.

Here, the passing line of the tether belt 40 is a line on which an intermediate portion of the tether belt 40 passes between connecting portions at both ends of the tether belt 40 in a state where the airbag body 20 is in an inflated configuration. When the tether belt 40 is arranged in a straight line shape in a state where the airbag body 20 is in an inflated configuration, a straight-line-shaped line constitutes the passing line of the tether belt 40. When the tether belt 40 is arranged in a bent shape in a state where the airbag body 20 is in an inflated configuration, a bent line with such a bent portion constitutes the passing line of the tether belt 40.

In this embodiment, the annular relay portion 48 is attached to the inner peripheral portion of the airbag body 20 in an inflated configuration. An intermediate portion of the tether belt 40 in the longitudinal direction is supported such that the intermediate portion of the tether belt 40 is movable along the longitudinal direction while passing through the annular relay portion 48. Further, in a state where the airbag body 20 is in an inflated configuration, the tether belt 40 is arranged such that the tether belt 40 is bent by way of the annular relay portion 48. In this embodiment, the annular relay portion 48 is attached to the inner peripheral portion of the airbag body 20 within the restricted portions. Accordingly, the longitudinally intermediate portion of the tether belt 40 passes through the restricted portion and is bent at the annular relay portion 48. In this embodiment, a portion of the tether belt 40 in the vicinity of the center of the tether belt 40 is movably supported by the annular relay portion 48. However, another portion of the tether belt 40, for example, a portion of the tether belt 40 close to one end side of the tether belt 40 may be movably supported by the annular relay portion.

The arrangement mode of the gas discharge state switching member 30 and the arrangement mode of the tether belt 40 are described more specifically.

Firstly, the opening portion 28h is formed on one side portion of a front side portion of the airbag body 20 having a small vertical direction size in an inflated configuration, and the gas discharge state switching member 30 is attached to the opening portion 28h. Thus, the gas discharge state switching member 30 is attached to one side portion of the front side portion of the airbag body 20 in an inflated configuration.

Further, one end portion of the tether belt 40 is connected to the gas discharge state switching member 30. In this embodiment, both side portions of the gas discharge state switching member 30 on a distal end side are connected to the tether belt 40. That is, one end portion of the tether belt 40 is formed to have a width size substantially equal to a width size of a distal end portion of the gas discharge state switching member 30. Here, the distal end portion 52 of the tether belt 40 is formed into a shape which expands in a Y shape. Here, both end portions of the distal end portion 52 of the tether belt 40 which expands in an approximately Y shape are sewed to both sides of the distal end portion of the gas discharge state switching member 30. Due to such a configuration, the tether belt 40 pulls the gas discharge state switching member 30 into the inside of the airbag body 20 by pulling both side portions of the gas discharge state switching member 30 on a distal end side. However, it is not indispensable in the present invention that the distal end portion of the tether belt 40 is formed into the shape which expands in a Y shape as described above.

Further, the other end portion of the tether belt 40 is connected to the other side portion of the front side portion of the airbag body 20 in an inflated configuration, that is, the other end portion of the tether belt 40 is connected to a portion of the airbag body 20 which faces the gas discharge state switching member 30 in the width direction of the airbag body 20. The other end portion of the tether belt 40 and the airbag body 20 are connected to each other by sewing or the like.

Further, the annular relay portion 48 is a member which is formed using a cloth or the like substantially equal to a cloth or the like used for forming the airbag body 20, and is attached to an upper portion of the front side portion of the airbag body 20 by sewing or the like such that the annular relay portion 48 is formed into an annular shape. In this embodiment, a portion of the airbag body 20 to which the annular relay portion 48 is attached is a portion of the airbag body 20 in an inflated configuration which faces the inflator 12 or a portion which is closer to a rear side (occupant side) than the portion which faces the inflator 12 is. The portion where the annular relay portion 48 is attached may be a portion of the airbag body 20 in an inflated configuration closer to a front side (a side away from the occupant). By setting the annular relay portion 48 at such a position, the tether belt 40 can be arranged such that the tether belt 40 is not directly exposed to gas supplied from the inflator 12 at a position very close to the inflator 12. Further, it is not indispensable in the present invention that the number of annular relay portions is set to one. A plurality of annular relay portions may be provided, and the tether belt may be arranged to be bent at the plurality of respective annular relay portions.

Further, the tether belt 40 is arranged such that, on the front side portion of the airbag body 20 in an inflated configuration, the tether belt 40 which extends from one side portion of the airbag body 20 passes through annular relay portion 48 arranged on an upper portion of the airbag body 20, and reaches the other side portion of the airbag body 20.

Further, a length of the tether belt 40 is set to a length size which satisfies the following condition. That is, the length size of the tether belt 40 is larger than a sum of a distance between the opening portion 28h of the airbag body 20 and the annular relay portion 48 and a distance between the annular relay portion 48 and a portion where the other end portion of the tether belt 40 is connected to the airbag body 20 in a state where, in the course of the inflation of the airbag body 20, the airbag body 20 (particularly, a portion of the airbag body 20 to which the tether belt 40 is connected and a portion of the airbag body 20 in the vicinity of a portion where the tether belt 40 passes through the annular relay portion 48) comes into contact with a head, a chest or the like of an occupant in an irregular posture so that the inflation of the airbag body 20 at portions where the gas discharge state switching member 30 and the tether belt 40 are arranged is partially interrupted (hereinafter, also referred to as "deployed state 1"). Accordingly, in such a state, the tether belt 40 is loosened so that the gas discharge state switching member 30 can be maintained in a gas discharge state or can be changed to the gas discharge state. On the other hand, the length of the tether belt 40 is set such that the sum of the distance between the opening portion 28h of the airbag body 20 and the annular relay portion 48 and the distance between the annular relay portion 48 and the portion where the other end portion of the tether belt 40 is connected to the airbag body 20 becomes larger than the length size of the tether belt 40 in the course of inflating the airbag body 20 to a size larger than the deployed state 1 when the inflation of the airbag body 20 is not interrupted by an occupant in an irregular posture thus allowing the airbag body 20 to be inflated to an assumed regular shape (hereinafter, the most inflated state also being referred to as "deployed state 2"). Accordingly, the tether belt 40 receives an inflation force so that the tether belt 40 is pulled between the portion of the inner peripheral portion of the airbag body 20 and the annular relay portion 48 and between the opening portion 28h and the annular relay portion 48 whereby the gas discharge state switching member 30 is pulled into the inside of the airbag body 20 and is changed over to a gas non-discharge state.

The airbag device 10 is assembled into the dashboard 8 of the vehicle as follows. That is, a lid portion 9 which can be easily broken through when the airbag body 20 is inflated is formed on an upward surface of the dashboard 8. A bracket or the like for mounting the airbag device 10 is mounted on an inner side of the lid portion 9 formed on the dashboard 8. The inflator 12 is mounted on the bracket and, further, the airbag device 10 is mounted on an inner portion of the upward surface of the dashboard 8 in a state where the airbag body 20 is folded. Further, when a vehicle collides or the like, gas generated by the inflator 12 is introduced into the airbag body 20 through the gas supply port 26h. Accordingly, the airbag body 20 is inflated, breaks through the lid portion 9, and is inflated toward an area above the dashboard 8 and toward a rear side of the vehicle (occupant side).

Figure 11:
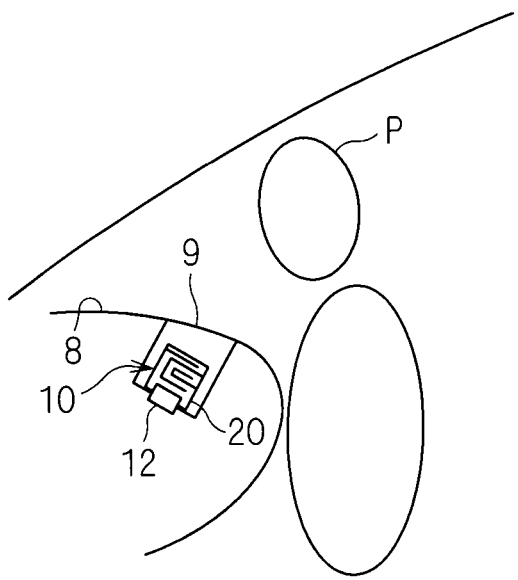
FIG. 11 is an explanatory view showing operation of the airbag device when an occupant is in an irregular posture.

Firstly, description is given of operation of the airbag body 20 when an occupant P is in an irregular posture as shown in FIG. 11. Here, the irregular posture means one of postures where the occupant P is out of the regular posture, and his or her head is closer to a dashboard 8 side compared to a case where the occupant P is in the regular posture. Particularly, in this embodiment, the description is made assuming the case where the occupant P is in an irregular posture where his or her head and his or her chest are positioned close to a dashboard arranged in a front portion of the vehicle in a state where the occupant P is seated on an occupant seat.

Figure 12:
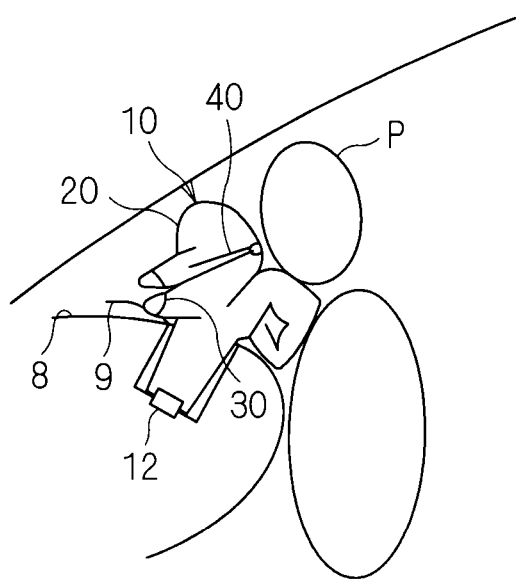
FIG. 12 is an explanatory view showing operation of the airbag device when an occupant is in an irregular posture.

In such a case, as shown in FIG. 12 and FIG. 13, the airbag body 20 hits the head or the chest of the occupant P in an initial stage of the inflation of the airbag body 20. Accordingly, the inflation of the airbag body 20 to an occupant side is interrupted so that the distances between portions where both end portions of the tether belt 40 are connected to the airbag body 20 and the annular relay portion 48 are maintained at a relatively small values and hence, a force which strongly pulls the tether belt 40 minimally acts on the tether belt 40. Accordingly, the tether belt 40 assumes a loosened state so that the gas discharge state switching member 30 assumes a gas discharge state. Here, the gas discharge state switching member 30 may be in a gas discharge state in an initial state, or the gas discharge state switching member 30 may be brought into a discharge state after being pulled out to the outside of the airbag body 20 due to an internal pressure of the airbag body 20.

Due to such operation, gas in the airbag body 20 passes through the gas discharge state switching member 30 from the opening portion 28h, and is discharged to the outside through the first vent holes 32h as rapidly as possible and hence, the rapid deployment and inflation of the airbag body 20 can be suppressed.

Figure 14:
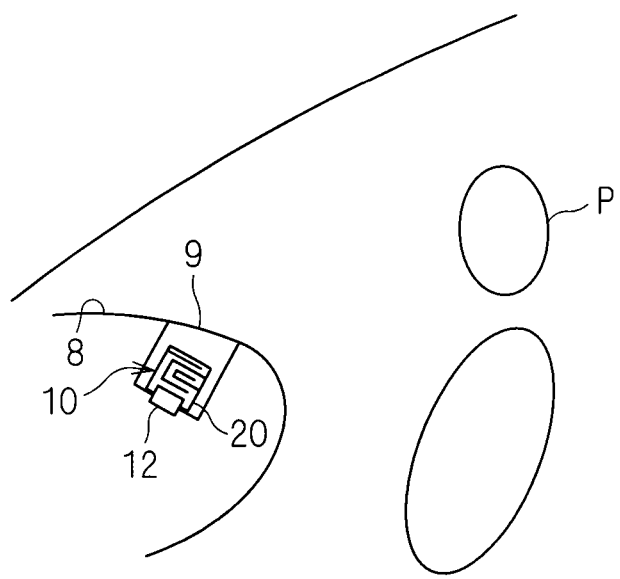
FIG. 14 is an explanatory view showing operation of the airbag device when an occupant is in a regular posture.

Next, description is given of operation of the airbag body 20 when the occupant P is in a regular posture as shown in FIG. 14. Here, assume that the occupant P is wearing a seat belt.

Figure 15:
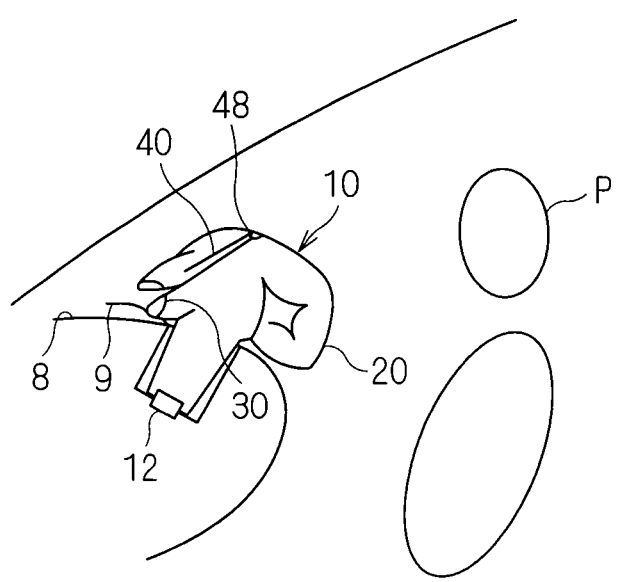
FIG. 15 is an explanatory view showing operation of the airbag device when an occupant is in a regular posture.

In such a case, as shown in FIG. 15, the airbag body 20 is inflated toward an occupant side without being interrupted by the occupant P or the like.

Figure 16:
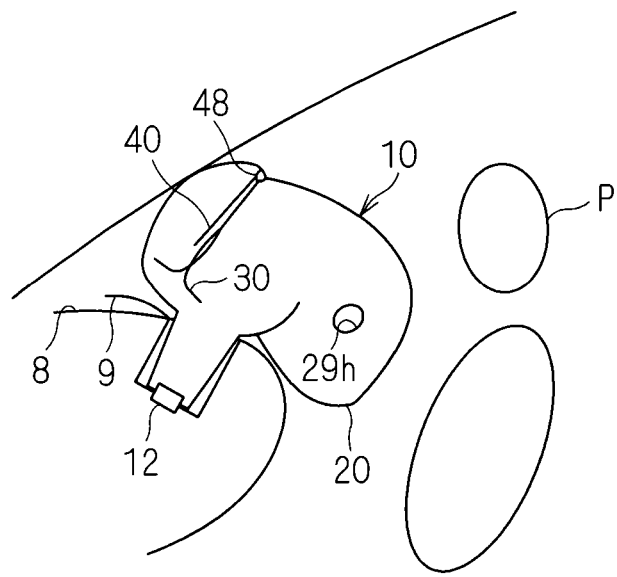
FIG. 16 is an explanatory view showing operation of the airbag device when an occupant is in a regular posture.

Then, as shown in FIG. 16, when the airbag body 20 is inflated to a certain extent so that a sum of a distance between the opening portion 28h of the airbag body 20 and the annular relay portion 48 and a distance between the annular relay portion 48 and the portion where the other end portion of the tether belt 40 is connected to the airbag body 20 exceeds the length size of the tether belt 40, the tether belt 40 is pulled. Due to a tensile force of the tether belt 40, the gas discharge state switching member 30 is pulled into the inside of the airbag body 20 so that the gas discharge state switching member 30 is changed over to a gas non-discharge state. Due to such a configuration, the airbag body 20 is rapidly inflated in a state where the discharge of gas through the gas discharge state switching member 30 is suppressed.

Figure 17:
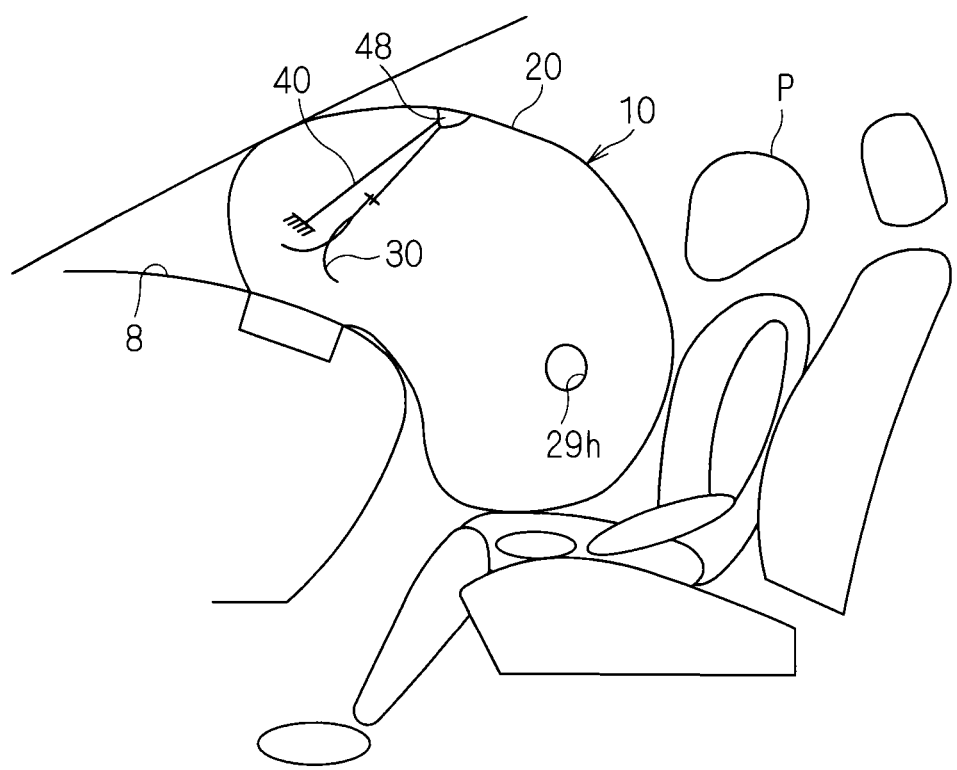
FIG. 17 is an explanatory view showing operation of the airbag device when an occupant is in a regular posture.

Then, as shown in FIG. 17, when the airbag body 20 is inflated substantially completely, the tether belt 40 is strongly pulled so that the gas discharge state switching member 30 is brought into a state where the gas discharge state switching member 30 is strongly pulled into the inside of the airbag body 20 and hence, the gas discharge state switching member 30 is substantially completely maintained in the gas non-discharge state against an internal pressure of the airbag body 20.

Figure 18:
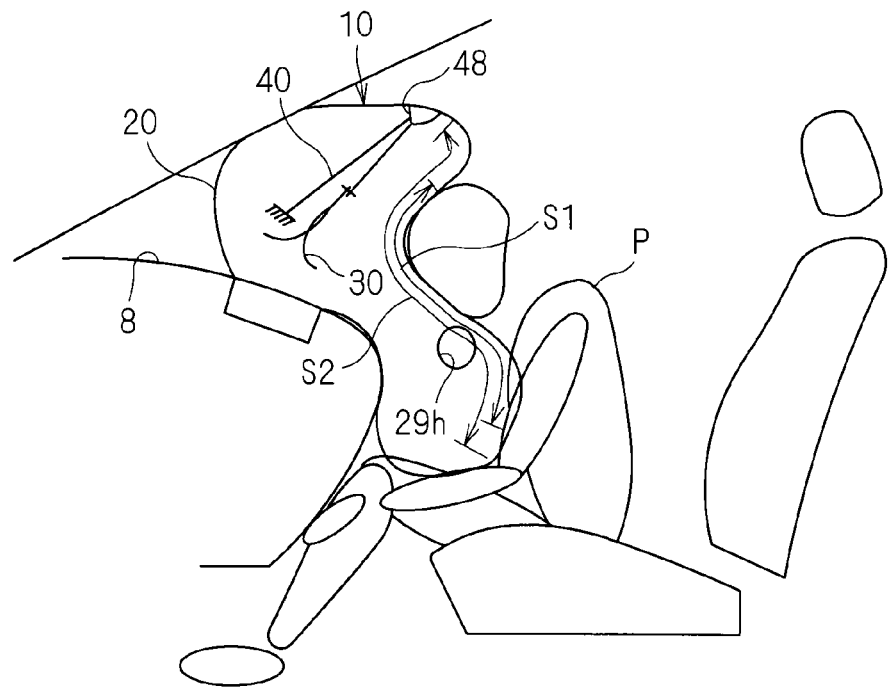
FIG. 18 is an explanatory view showing operation of the airbag device when an occupant is in a regular posture.
Figure 19:
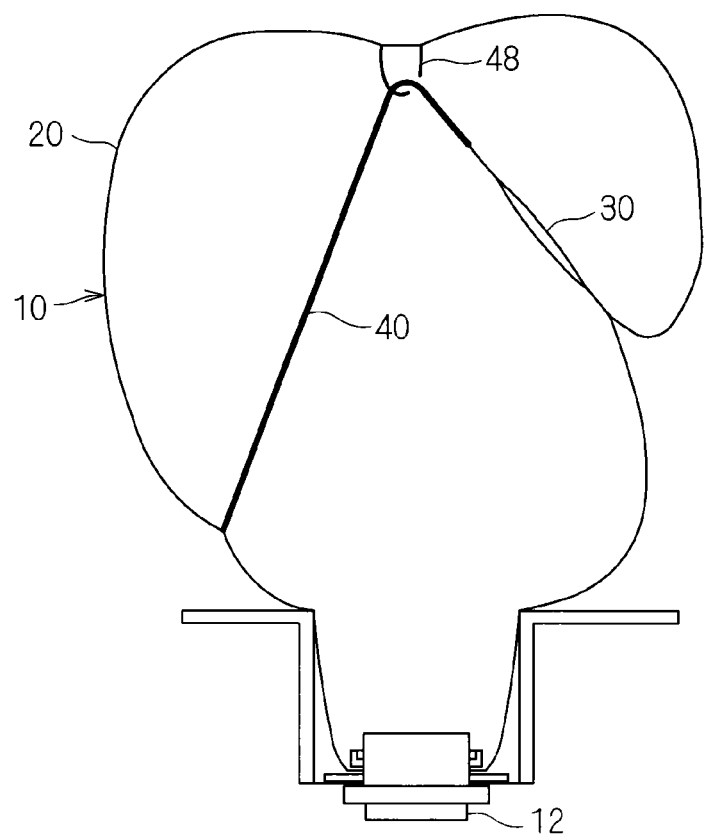
FIG. 19 is an explanatory view showing operation of the airbag device when an occupant is in a regular posture.

Subsequently, as shown in FIG. 18 and FIG. 19, the airbag body 20 receives the occupant P which moves frontward due to an impact generated by the collision of the vehicle, and absorbs the impact on the occupant P. In such a state, although the discharge of gas through the gas discharge state switching member 30 and the opening portion 28h is suppressed, the gas is discharged through the second vent hole 29h. Of course, a discharge amount of gas discharged through the second vent hole 29h is set to a level that the airbag body 20 can gradually receive the impact on the occupant P as described above. Due to such setting, the impact on the occupant P is gradually received by the airbag body 20.

By setting the position where the gas discharge state switching member 30 is connected to the airbag body 20, the position where the tether belt 40 is connected to the airbag body 20, the passing line and the like at portions of the airbag body 20 which are not deformed in an inflated configuration when the airbag body 20 receives the occupant P, even in the course of receiving the occupant P, the tether belt 40 is maintained in a pulled state and hence, the discharge of gas through the gas discharge state switching member 30 and the opening portion 28h can be suppressed.

Figure 20:
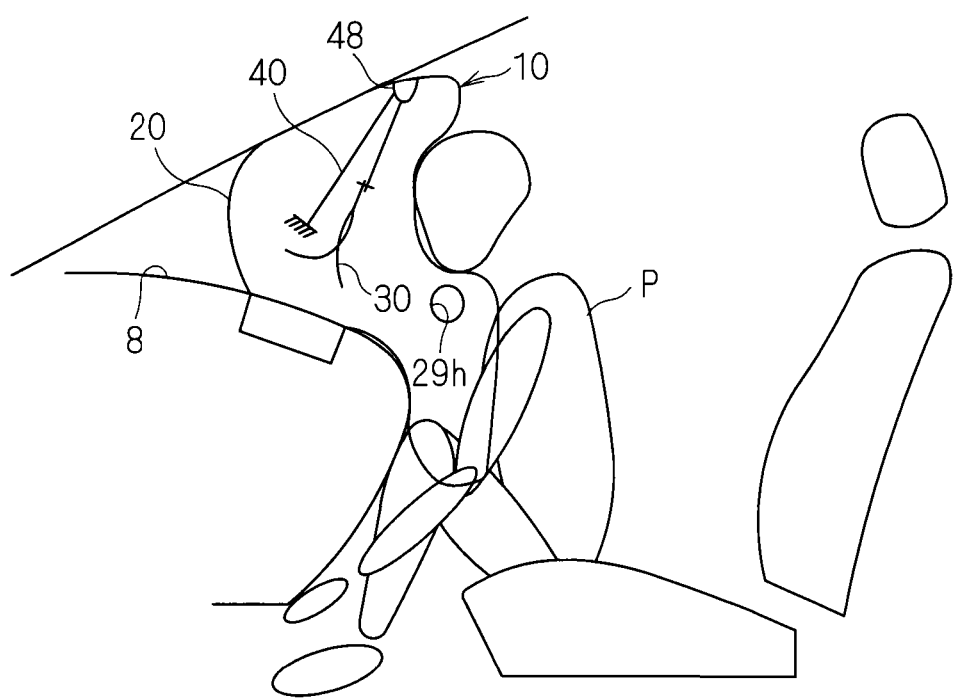
FIG. 20 is an explanatory view showing operation of the airbag device when an occupant is in a regular posture and in a seat belt non wearing state.

FIG. 20 is a view assuming a case where an occupant P is in a regular posture but is not wearing a seat belt. In such a case, the occupant P sinks into the airbag body 20 more deeply.

Accordingly, it is preferable that the position where the gas discharge state switching member 30 is connected to the airbag body 20, the position where the tether belt 40 is connected to the airbag body 20, and the passing line be set to portions of the airbag body 20 in an inflated configuration which are not deformed even when the airbag body 20 receives the occupant P who is not wearing a seat belt, that is, to portions of the airbag body 20 in an inflated configuration closer to a front side. Due to such setting of the positions, even in the course of receiving the occupant P who is not wearing a seat belt, the tether belt 40 is maintained in a pulled state and hence, the discharge of gas through the gas discharge state switching member 30 and the opening portion 28h can be suppressed.

Figure 21:
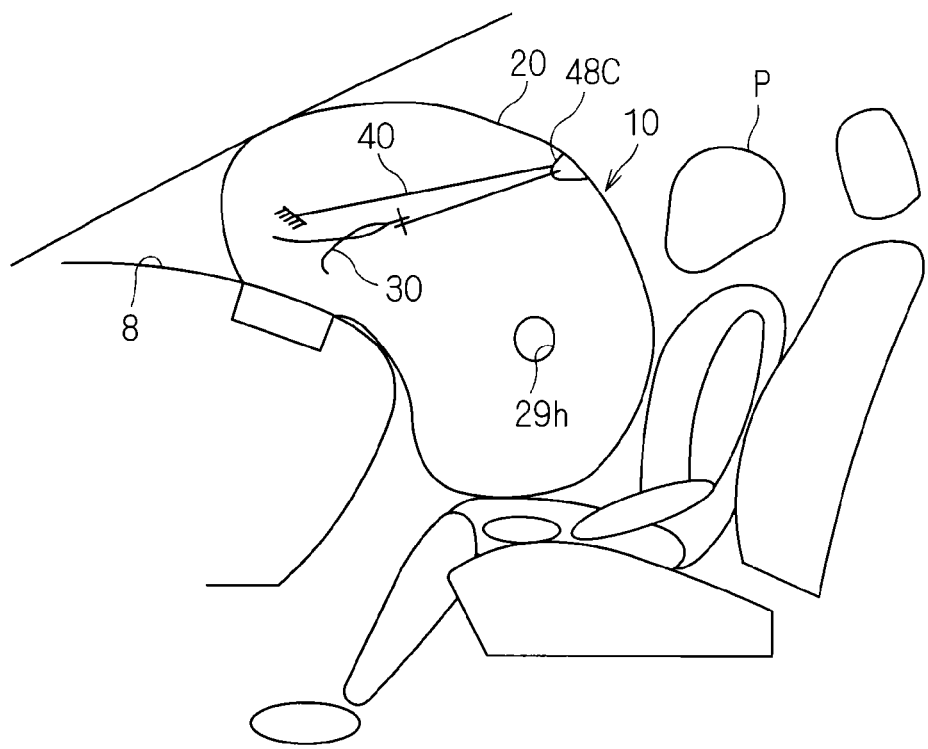
FIG. 21 is an explanatory view showing operation of the airbag device according to a comparison example.
Figure 22:
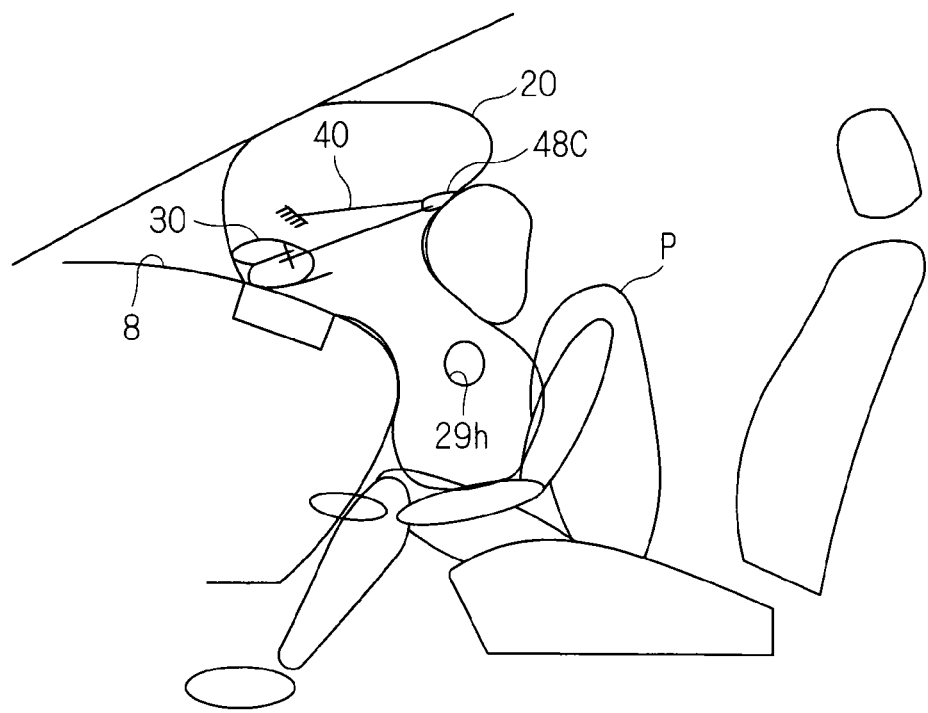
FIG. 22 is an explanatory view showing operation of the airbag device according to a comparison example.

As a comparison example, FIG. 21 and FIG. 22 show an example where an annular relay portion 48C which corresponds to the annular relay portion 48 is attached to a rear portion (occupant-side portion) of an airbag body 20 in an inflated configuration. In such a case, when an occupant P comes into contact with the inflated airbag body 20 and sinks into the airbag body 20, a tether belt 40 is loosened in a relatively initial stage, and gas is discharged through the gas discharge state switching member 30. Accordingly, in the case shown in FIG. 21 and FIG. 22, it is necessary to set a discharge speed of gas discharged through the gas discharge state switching member 30 at a relatively low speed. Then, a gas discharge speed becomes insufficient from a viewpoint of taking a countermeasure to protect an occupant P in the irregular posture so that another countermeasure becomes necessary.

According to the airbag device 10 having the configuration, when the inflated airbag body 20 receives an occupant P in a regular posture, the occupant P comes into contact with the contact portion S1 and hence, the tether belt 40 is maintained in a pulled state. Accordingly, the gas discharge state switching member 30 maintains a gas non-discharge state. Accordingly, rapid discharge of gas can be suppressed so that the airbag device 10 can receive an impact on the occupant P in a regular posture. On the other hand, when the occupant P is in an irregular posture state, in an initial stage of the inflation of the airbag body 20, the occupant P comes into contact with the portion of the airbag body 20 which avoids the contact portions S1. Accordingly, a state where the tether belt 40 is loosened is maintained, and the gas discharge state switching member 30 maintains a gas discharge state or is changed over to a gas discharge state. Accordingly, gas can be discharged through the gas discharge state switching member 30 as rapidly as possible so that it is possible to prevent the airbag body 20 from hitting the occupant P with large power to the maximum. By disposing the position where the gas discharge state switching member 30 is arranged, the position where the tether belt 40 is connected to the inner peripheral portion of the airbag body 20 and the passing line of the tether belt 40 at the portions of the airbag body 20 in an inflated configuration which avoid the deformed portion S2 which is deformed when the airbag body 20 receives the occupant P, even in the course that the occupant P sinks into the airbag body 20, the discharge of gas through the gas discharge state switching member 30 can be suppressed so that the airbag body 20 can more surely and gradually receive an impact on the occupant P.

Further, the occupant P comes into contact with the airbag body 20 in an inflated configuration from behind (from a seat side) and hence, even when the position where the gas discharge state switching member 30 is arranged, the position where the tether belt 40 is connected to the inner peripheral portion of the airbag body 20, and the passing line of the tether belt 40 are arranged at the front half portion of the airbag body 20 in an inflated configuration, the airbag body 20 can more surely and gradually receive an impact on the occupant P.

Further, on the inner peripheral portion of the airbag body 20 in an inflated configuration, the annular relay portion 48 which supports the intermediate portion of the connecting member in the longitudinal direction such that the connecting member is movable along the longitudinal direction of the connecting member is attached and hence, a pulling amount of the tether belt 40 can be further increased. For example, when the annular relay portion 48 is omitted, a pulling amount of the tether belt 40 is only at a level corresponding to the difference in distance between two points which are portions to which both ends of the tether belt 40 are connected respectively between the deployed state 1 and deployed state 2. To the contrary, when the annular relay portion 48 is provided and the tether belt 40 is arranged such that the tether belt 40 is bent by way of the annular relay portion 48, between the deployed state 1 and deployed state 2, a pulling amount of the tether belt 40 becomes a level corresponding to the difference in a sum of a distance between one destination to which the tether belt 40 is connected and the annular relay portion 48 and a distance between another destination to which the tether belt 40 is connected and the annular relay portion 48. Accordingly, between the deployed state 1 and deployed state 2, a pulling amount of the tether belt 40 necessary for changing over a state of the gas discharge state switching member 30 between a gas discharge state and a gas non-discharge state can be increased and hence, the difference of the gas discharge state switching member 30 between the gas discharge state and the gas non-discharge state (that is, the difference in an amount of gas to be discharged) can be increased whereby the gas discharge state switching member 30 can be easily brought into a more complete gas non-discharge state or a more complete gas discharge state.

However, the provision of the annular relay portion 48 is not indispensable.

Further, the gas discharge state switching member 30 is arranged on one side portion of the airbag body 20 in an inflated configuration, the annular relay portion 48 is arranged on the upper portion or the front portion of the airbag body 20 in an inflated configuration, and one end portion of the tether belt 40 is connected to the gas discharge state switching member 30 and, further, the tether belt 40 is connected to the inner peripheral portion of the other side portion of the airbag body 20 in an inflated configuration by way of the annular relay portion 48. Accordingly, in a state where the airbag body 20 is in an inflated configuration, the tether belt 40 can be more surely pulled so that the gas discharge state switching member 30 can be more completely pulled into the airbag body 20 whereby the gas discharge state switching member 30 can be more surely changed over to the gas non-discharge state.

Further, the mode also has an advantageous effect that gas from the inflator 12 is minimally directly blown off to the tether belt 40.

Further, a second vent hole 29h through which gas is discharged at a gas discharge speed lower than a gas discharge speed at the gas discharge state switching member 30 in a gas discharge state is formed in the airbag body 20. Accordingly, also when the gas discharge state switching member 30 is not changed over to a gas discharge state, that is, also when the airbag body 20 is inflated in a normal manner and receives an occupant P in a regular posture, gas is gradually discharged through the second vent hole 29h and hence, the airbag body 20 can gradually receive an impact on an occupant P.

It is needless to say that the switching type discharge mechanism shown in FIG. 21 and FIG. 22 may be assembled to the airbag body 20 in place of the second vent hole 29h or in addition to the second vent hole 29h. Further, the second vent hole 29h may be omitted.

{Modification}

Figure 23:
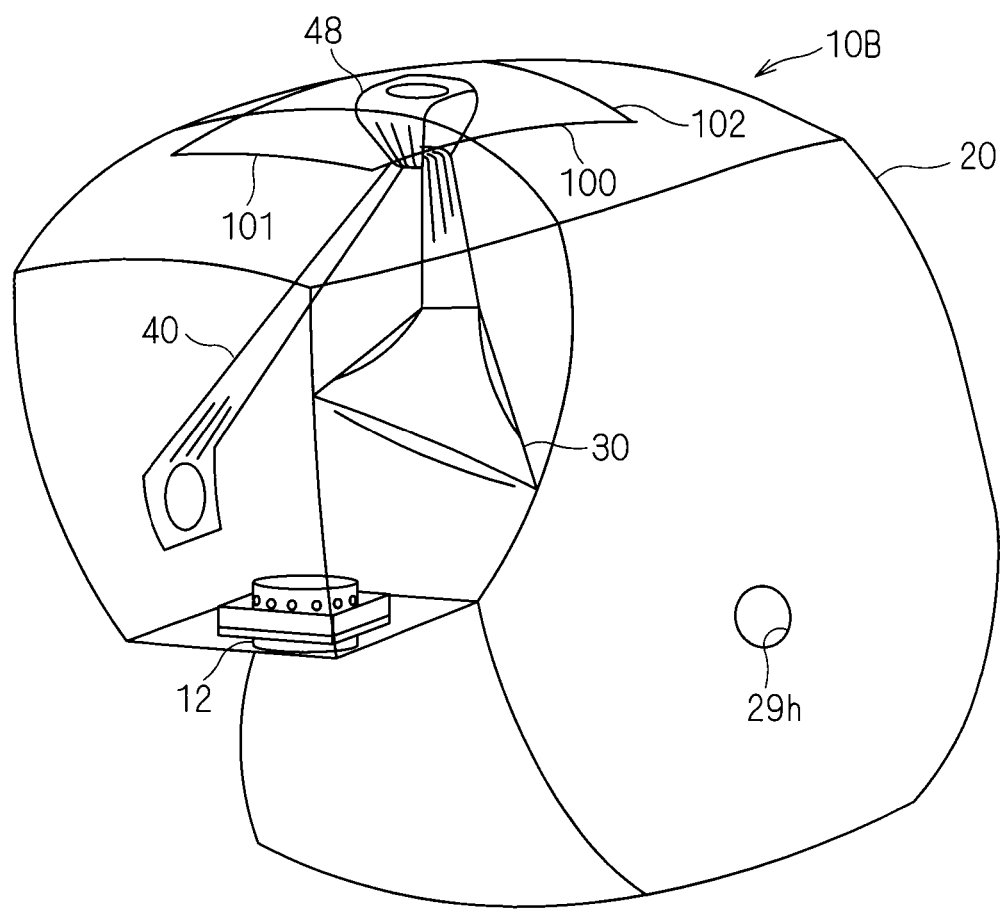
FIG. 23 is a schematic perspective view showing an inflated configuration of an airbag device according to a modification.

FIG. 23 is a schematic perspective view showing a modification of the embodiment.

In an airbag device 10B according to this modification, a flap 100 is provided to the airbag body 20 according to the embodiment.

The flap 100 is a flexible sheet-shaped member formed of a cloth or the like, and is formed into a quadrangular shape in this modification. As a matter of course, the flap 100 may be formed into a polygonal shape, a circular shape or the like besides a quadrangular shape.

A proximal end portion 101 (one side edge portion in this embodiment) of the flap 100 is connected to an outer peripheral portion of the airbag body 20 by sewing or the like. Further, a distal end portion 102 of the flap 100 on a side opposite to the proximal end portion 101 extends toward a side opposite to a gas supply port 26h such that the flap 100 covers the airbag body 20 during a period from an initial stage of the inflation of the airbag body 20 to the midst of the inflation of the airbag body 20.

In this modification, the proximal end portion 101 of the flap 100 is, as viewed in a side view of the airbag body 20, connected to an outer periphery of the airbag body 20 on a side closer to a gas supply port 26h side than a portion where the annular relay portion 48 is attached to the airbag body 20 is. To be more specific, the proximal end portion 101 of the flap 100 is connected to the airbag body 20 on a side closer to a front side of a vehicle than the portion where the annular relay portion 48 is attached to the airbag body 20 is. Further, as viewed in a side view of the airbag body 20, the distal end portion 102 of the flap 100 extends over the outer periphery of the airbag body 20 toward a side opposite to the gas supply port 26h (a front side of the vehicle, that is, an occupant side) such that the distal end portion 102 goes beyond the portion of the airbag body 20 where the annular relay portion 48 is attached. In other words, the flap 100 is disposed such that the flap 100 covers the portion of the airbag body 20 where the annular relay portion 48 is attached in the course of the inflation or after completion of the inflation from a portion in front of the annular relay portion 48 to a portion behind the annular relay portion 48 in the longitudinal direction of the vehicle.

Due to such a configuration, when a head or a chest of an occupant in an irregular posture is present at a position above the inflator 12 or at a position closer to an occupant seat from the position above the inflator 12 in the course of the inflation of the airbag body 20, the flap 50 is sandwiched between the airbag body 20 in the course of the inflation and the occupant. Accordingly, it is possible to suppress the occurrence of a state where a portion of the airbag body 20, particularly, a peripheral portion of the portion of the airbag body 20 where the annular relay portion 48 is attached is removed from between the dashboard and the occupant in an irregular posture.

Figure 24:
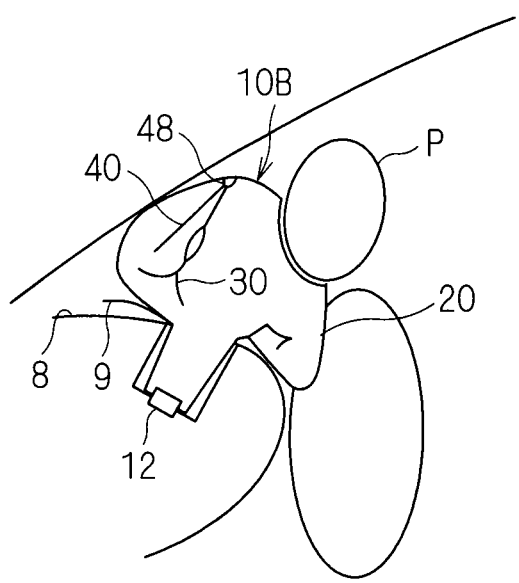
FIG. 24 is an explanatory view showing one example of operation of the airbag device when a flap is not provided.

That is, assume a case where the occupant P is in a posture closer to the regular posture than to the irregular posture assumed in the embodiment, and the flap 100 is not provided. In such a case, depending on setting of a position of the annular relay portion 48 or the like, as shown in FIG. 24, there may be a case where a peripheral portion of the annular relay portion 48 is removed from between the dashboard 8 and the occupant P in the course of the inflation of the airbag body 20.

To the contrary, by providing the flap 100 as described above, it is possible to suppress the occurrence of the state where the peripheral portion of the airbag body 20 where the annular relay portion 48 is attached is removed from between the dashboard 8 and the occupant P as described above.

Figure 25:
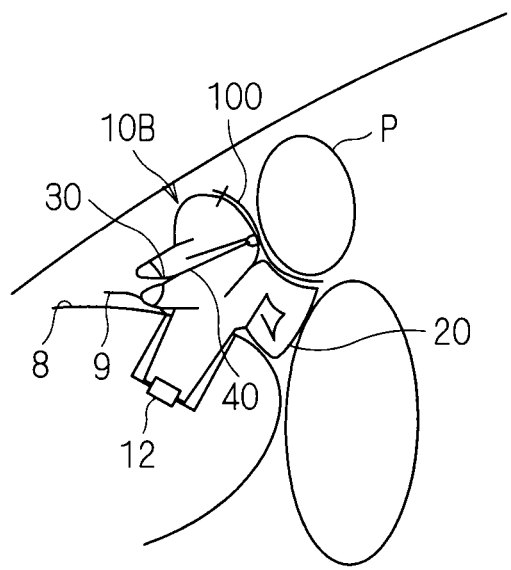
FIG. 25 is an explanatory view showing operation of an airbag device according to the modification when an occupant is an irregular posture.

That is, as shown in FIG. 25, the airbag body 20 intends to inflate toward an area above the dashboard 8 and toward a rear side of the vehicle (occupant P side) from the dashboard 8.

Here, when a head or a chest of the occupant P is positioned in the vicinity of the portion where the annular relay portion 48 is attached, the rapid inflation of the airbag body 20 is suppressed by operation described in the embodiment.

When the occupant P is in a posture closer to the regular posture than to the posture or the like, there may be a case where the peripheral portion of the portion of the airbag body 20 where the annular relay portion 48 is attached is positioned closer to a front side of the vehicle than the head or the chest of the occupant P is. Here, the flap 100 covers the airbag body 20 from above in the course of the inflation, and a portion of the flap 100 on an occupant P side disposed behind the peripheral portion of the portion where the annular relay portion 48 is attached in the longitudinal direction of the vehicle faces the occupant P. Accordingly, the flap 100 is sandwiched between the airbag body 20 in the course of the inflation and the occupant P. The airbag body 20 starts the inflation from a state where the airbag body 20 is folded and hence, in the course of the inflation, a state where the airbag body 20 is folded to some extent in a certain configuration remains. However, when the flap 100 is sandwiched between the airbag body 20 in the course of the inflation and the occupant P as described above, a force to inflate the airbag body 20 is received by the flap 100 and the sandwiched portion and hence, an inflation force minimally acts on an inner side of the flap 100. Accordingly, the inflation of the airbag body 20 is suppressed at the portion of the airbag body 20 disposed on the inner side of the flap 100 and a portion below the inner side of the flap 100 and hence, the tether belt 40 is minimally pulled. Due to such a configuration, the tether belt 40 assumes a loosened state, and the gas discharge state switching member 30 assumes a gas discharge state.

Figure 26:
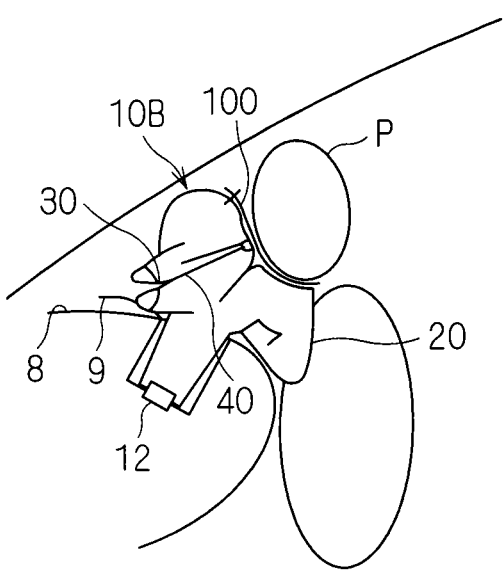
FIG. 26 is an explanatory view showing operation of an airbag device according to the modification when an occupant is in an irregular posture.
Figure 27:
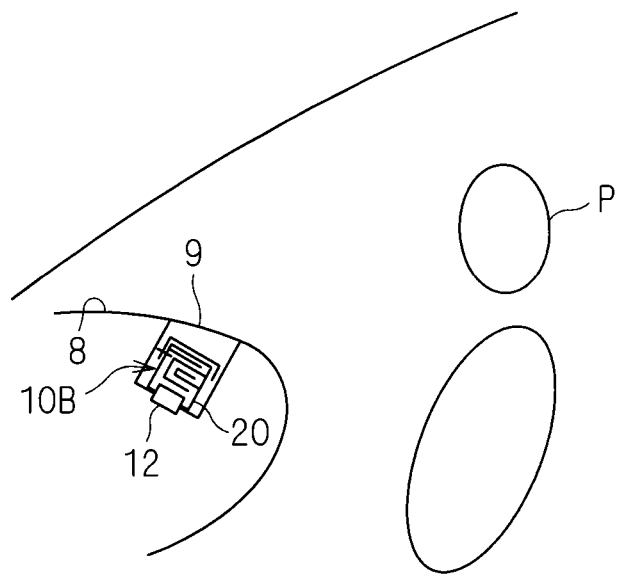
FIG. 27 is an explanatory view showing operation of an airbag device according to the modification when an occupant is in a regular posture.
Figure 28:
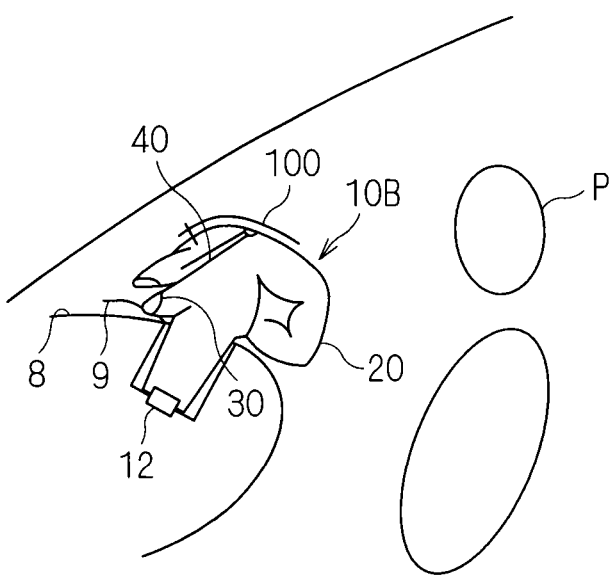
FIG. 28 is an explanatory view showing operation of an airbag device according to the modification when an occupant is in a regular posture.
Figure 29:
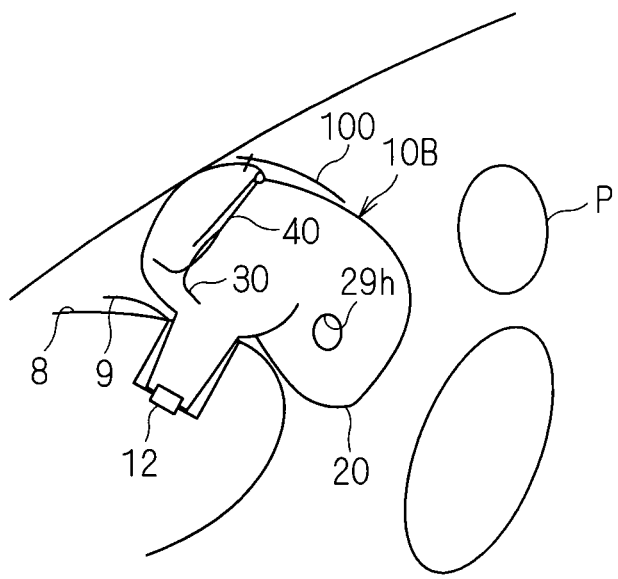
FIG. 29 is an explanatory view showing operation of an airbag device according to the modification when an occupant is in a regular posture.
Figure 30:
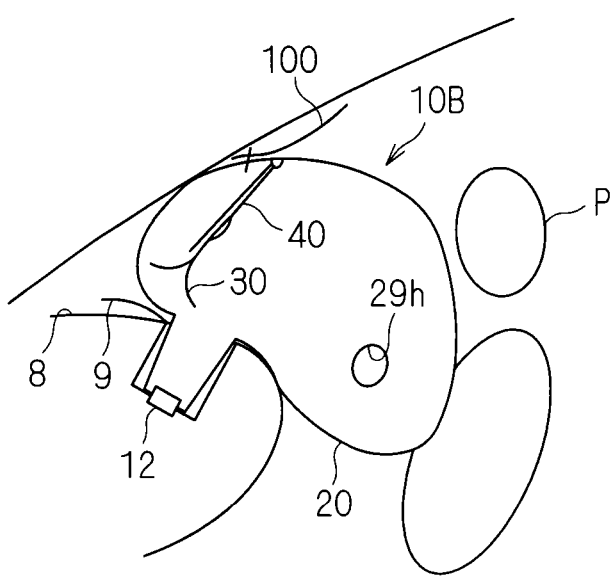
FIG. 30 is an explanatory view showing operation of an airbag device according to the modification when an occupant is in a regular posture.

Accordingly, as shown in FIG. 26, gas in the airbag body 20 passes through the gas discharge state switching member 30 from the opening portion 28h and is discharged to the outside through the first vent holes 32h and hence, the rapid deployment and inflation of the airbag body 20 can be suppressed.

Here, when the occupant P is in a regular posture, as shown in FIG. 27 to FIG. 30, the flap 100 merely covers the airbag body 20 from above in the course of the inflation or in an inflated configuration and does not come into contact with the occupant P. Accordingly, the airbag body 20 can receive the occupant P by being inflated in the same manner as the embodiment.

Although the description has been made assuming the embodiment where the annular relay portion 48 is provided in this modification, the present invention is also applicable to a case where the annular relay portion 48 is not provided.

In such a case, it is sufficient that one of destinations to which the tether belt is connected is disposed at a position closer to an upper portion of the airbag body, and a flap is provided so as to cover such a connecting portion.

According to this modification, when the airbag body 20 is used in such a manner that the airbag body 20 is inflated toward the occupant P in an irregular posture, the flap 100 comes into contact with the occupant and is sandwiched between the occupant P and the airbag body 20 and hence, a partial inflation of the airbag body 20 is suppressed at the portion on the inner side of the flap 100. By suppressing the partial inflation of the airbag body 20, the pulling of the tether belt 40 can be suppressed so that it is possible to suppress the occurrence of a state where the gas discharge state switching member 30 is changed over to a gas non-discharge state or is maintained in the gas non-discharge state. Accordingly, when the occupant P is in an irregular posture, it is possible to suppress the rapid inflation of the airbag body 20 as much as possible regardless of the position and the posture of the occupant P.

Figure 31:
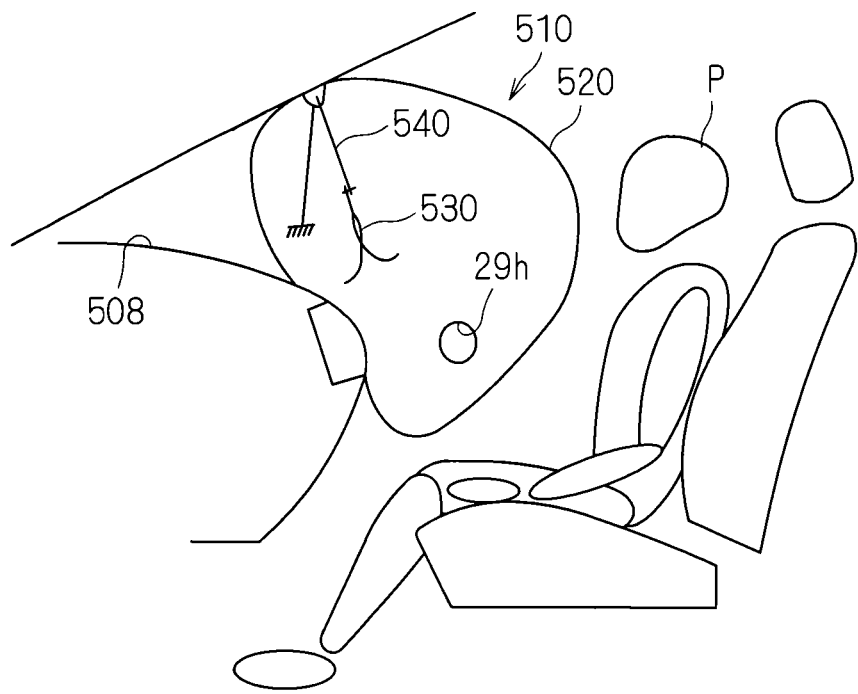
FIG. 31 is an explanatory view showing operation of an airbag device according to another modification.
Figure 32:
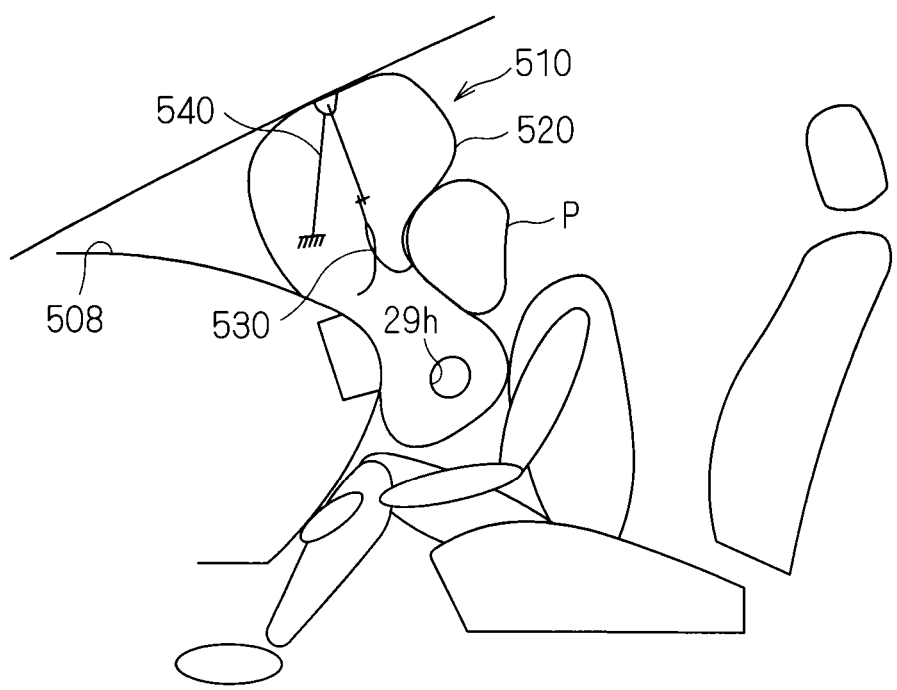
FIG. 32 is an explanatory view showing operation of an airbag device according to another modification.

Further, in the embodiment and modification, although the description has been made with respect to an example where the airbag device 10 is attached to a portion of the dashboard 8 which is directed upward, as shown in FIG. 31 and FIG. 32, an airbag device 510 corresponding to the airbag device 10 may be attached to a portion of a dashboard 508 which is directed to an occupant P side. In such a case, when a position where a gas discharge state switching member 530 corresponding to the gas discharge state switching member 30 is positioned on an airbag body 520 corresponding to the airbag body 20, a portion of the airbag body 520 to which a tether belt 540 corresponding to the tether belt 40 is connected, a passing line and the like are set in the same manner as the embodiment, substantially the same advantageous effects as the embodiment can be obtained.

It is needless to say that the airbag device may be arranged at an intermediate position between the position where the airbag device is arranged in the embodiment and the position where airbag device is arranged as shown in FIG. 31 and FIG. 32. That is, the airbag device may be arranged at a portion of the dashboard which is directed obliquely rearward.

The respective configurations described in the embodiment and the respective modifications may be suitably combined with each other unless these modifications conflict with each other.

Although the present invention has been described in detail heretofore, the description has been provided only for exemplifying purposes in all aspects, and the present invention is not limited by the description. It is construed that numerous modifications which are not exemplified in this specification are conceivable without departing from the scope of the present invention.

The invention claimed is:

1. An airbag device comprising:
   an airbag which has a gas supply port and an inner peripheral portion;
   an inflator which supplies gas to the inside of said airbag through said gas supply port;
   a gas discharge state switching member which is attached to an opening portion provided in said airbag, and is configured to be changed over from a gas discharge state where the gas in said airbag is dischargeable to a gas non-discharge state where discharge of the gas in said airbag is suppressed;

a connecting member comprising one end portion which is connected to said gas discharge state switching member, and the other end portion which is connected to a portion of said inner peripheral portion of said airbag such that when said inflator initially supplies gas to the inside of said airbag, said gas discharge state switching member is on the outside of the opening portion of the airbag and in a gas discharge state where gas in said airbag is dischargeable through the gas discharge state switching member, and as the inflator continues to supply gas to the inside of the airbag causing expansion of the airbag, the connecting member is configured to pull the gas discharge state switching member into the inside of the airbag thereby changing the gas discharge state switching member over to a gas non-discharge state where discharge of the gas from said airbag through said gas discharge state switching member is suppressed; and a vent hole which is formed in said airbag and through which the gas is discharged at a gas discharge speed slower than a gas discharge speed of said gas discharge state switching member in said gas discharge state, wherein:

an annular relay member attached to the inner peripheral portion of said airbag and which supports therein said connecting member movably along its longitudinal direction, and said connecting member is bent by said annular relay member with said airbag is in an inflated configuration, and said opening portion, the portion where the other end portion of said connecting member is connected, and said annular relay member attached portion are provided in said airbag where an occupant in a regular posture does not come into contact when the airbag in an inflated configuration receives the occupant, and said annular relay member is provided where an occupant in an irregular posture comes into contact in an initial stage of the inflation of the airbag.

2. The airbag device according to claim 1, wherein the arranged position of said gas discharge state switching member, the connected position of said connecting member to the inner peripheral portion of said airbag, and an attached position of said annular relay member are disposed to avoid a portion of said airbag which is deformed when the airbag in an inflated configuration receives an occupant in a regular posture state with said airbag.

3. The airbag device according to claim 1, wherein the arranged position of said gas discharge state switching member, the connected position of said connecting member to the inner peripheral portion of said airbag, and an attached position of said annular relay member are arranged on a front half portion of said airbag which is divided in two in the longitudinal direction of the vehicle of said airbag in an inflated configuration which is inflated from a vehicle assembled state.

4. The airbag device according to claim 1, wherein said gas discharge state switching member is attached to one side portion of said airbag in an inflated configuration, said annular relay member is attached to an upper portion or a front portion of said airbag in an inflated configuration, and one end portion of said connecting member is connected to said gas discharge state switching member and the other end portion of said connecting member is connected to an inner peripheral portion of the other side portion of said airbag in an inflated configuration by way of said annular relay member.

5. The airbag device according to claim 1, further comprising a flap which extends such that a proximal end portion of the flap is connected to an outer peripheral portion of said airbag, and a distal end portion of the flap is directed to a side opposite to said gas supply port and covers said airbag.

6. An airbag device, comprising:
an airbag which has a gas supply port;
an inflator which supplies gas to the inside of said airbag through said gas supply port;
a gas discharge state switching member which is attached to said airbag, and is configured to be changed over from a gas discharge state where the gas in said airbag is dischargeable to a gas non-discharge state where discharge of the gas in said airbag is suppressed when the gas discharge state switching member is pulled into the inside of said airbag;
a connecting member whose one end portion is connected to said gas discharge state switching member and the other end portion is connected to a portion of an inner peripheral portion of said airbag; and
a vent hole which is formed at said airbag and through which the gas is discharged at a gas discharge speed slower than a gas discharge speed of said gas discharge state switching member in said gas discharge state, wherein
an annular relay member which movably supports said connecting member along a longitudinal direction is attached to the inner peripheral portion of said airbag,
said connecting member is bent by way of said annular relay member with said airbag in an inflated configuration,
an arranged position of said gas discharge state switching member, a connected position of said connecting member to the inner peripheral portion of said airbag, and an attached position of said annular relay member are disposed where avoid a portion of said airbag which comes into contact with an occupant in a regular posture state when the airbag in an inflated configuration receives the occupant,
wherein said gas discharge state switching member is attached to one side portion of said airbag in an inflated configuration, said annular relay member is attached to an upper portion or a front portion of said airbag in an inflated configuration, and one end portion of said connecting member is connected to said gas discharge state switching member and the other end portion of said connecting member is connected to an inner peripheral portion of the other side portion of said airbag in an inflated configuration by way of said annular relay member.

7. An airbag device, comprising:
an airbag which has a gas supply port;
an inflator which supplies gas to the inside of said airbag through said gas supply port;
a gas discharge state switching member which is attached to said airbag, and is configured to be changed over from a gas discharge state where the gas in said airbag is dischargeable to a gas non-discharge state where discharge of the gas in said airbag is suppressed when the gas discharge state switching member is pulled into the inside of said airbag;
a connecting member whose one end portion is connected to said gas discharge state switching member and the other end portion is connected to a portion of an inner peripheral portion of said airbag; and a vent hole which is formed at said airbag and through which the gas is discharged at a gas discharge speed slower than a gas discharge speed of said gas discharge state switching member in said gas discharge state, wherein an annular relay member which movably supports said connecting member along a longitudinal direction is attached to the inner peripheral portion of said airbag, said connecting member is bent by way of said annular relay member with said airbag in an inflated configuration, an arranged position of said gas discharge state switching member, a connected position of said connecting member to the inner peripheral portion of said airbag, and an attached position of said annular relay member are disposed where avoid a portion of said airbag which comes into contact with an occupant in a regular posture state when the airbag in an inflated configuration receives the occupant, and further comprising a flap which extends such that a proximal end portion of the flap is connected to an outer peripheral portion of said airbag, and a distal end portion of the flap is directed to a side opposite to said gas supply port and covers said airbag.

* * * * *